(12) United States Patent
Fischer, Jr. et al.

(10) Patent No.: US 7,886,986 B2
(45) Date of Patent: Feb. 15, 2011

(54) BUILDING, VENTILATION SYSTEM, AND RECOVERY DEVICE CONTROL

(75) Inventors: John C. Fischer, Jr., Marietta, GA (US); Michael L. Boles, Hallsville, MO (US); Richard K. Mitchell, Columbia, MO (US)

(73) Assignee: Semco Inc., Columbia, MO (US)

( * ) Notice: Subject to any disclaimer, the term of this patent is extended or adjusted under 35 U.S.C. 154(b) by 695 days.

(21) Appl. No.: 11/594,586

(22) Filed: Nov. 8, 2006

(65) Prior Publication Data

US 2008/0108295 A1 May 8, 2008

(51) Int. Cl.
*F24F 7/00* (2006.01)

(52) U.S. Cl. .................. 236/49.3; 62/94; 62/271; 95/113; 96/125

(58) Field of Classification Search .......... 236/49.3; 62/93, 94, 271, 304, 314, 232; 165/7; 95/113; 96/125, 144; 454/228, 229
See application file for complete search history.

(56) References Cited

U.S. PATENT DOCUMENTS

| | | | |
|---|---|---|---|
| 1,682,588 A | 8/1929 | Wietzel et al. | |
| 2,462,798 A | 2/1949 | Wilson | |
| 2,499,680 A | 3/1950 | Plank | |
| 2,723,837 A | 11/1955 | Pennington | |
| 2,892,981 A | 4/1958 | Shapiro | |
| 2,926,502 A | 3/1960 | Munters et al. | |
| 3,009,540 A | 11/1961 | Munters | |
| 3,009,684 A | 11/1961 | Munters | |
| 3,024,867 A | 3/1962 | Milton | |
| 3,024,868 A | 3/1962 | Milton | |
| 3,078,635 A | 2/1963 | Milton | |
| 3,125,157 A | 3/1964 | Munters et al. | |
| 3,130,021 A | 4/1964 | Milton | |

(Continued)

FOREIGN PATENT DOCUMENTS

DE 133855 1/1979

(Continued)

OTHER PUBLICATIONS

Webster's II New Riverside University Dictionary, 1994.

(Continued)

*Primary Examiner*—Cheryl J Tyler
*Assistant Examiner*—Paolo Gonzalez
(74) *Attorney, Agent, or Firm*—Bryan Cave LLP

(57) ABSTRACT

Control systems for recovery wheels, ventilation systems with recovery devices, buildings having ventilation, and methods of controlling recovery wheels and controlling or modifying ventilation systems. A parameter of ventilation systems or recovery devices, such as the speed of a recovery wheel, may be controlled as a function of pressure, differential pressure, flow rate, or fan speed, for example, to provide appropriate purge flow to maintain purge effectiveness and limit the carry-over of contaminants from a return/exhaust airstream to an outside/supply airstream, for instance, in a variable air-volume system. A purge angle may be set at a minimum position commensurate with a maximum flow rate and recovery-wheel speed may be reduced at lower flows to maintain purge effectiveness. In some embodiments, temperature and humidity are measured, and wheel speed is also controlled as a function of these measurements. Systems may utilize sensors, input devices, digital controllers, variable-speed drives, and alarms.

23 Claims, 22 Drawing Sheets

U.S. PATENT DOCUMENTS

| | | |
|---|---|---|
| 3,144,901 A | 8/1964 | Meek |
| 3,148,040 A | 9/1964 | Kern, Jr. |
| 3,242,641 A | 3/1966 | Makin, Jr. |
| 3,266,973 A | 8/1966 | Crowley |
| 3,338,034 A | 8/1967 | Hemstreet |
| 3,528,224 A | 9/1970 | Warn |
| 3,597,169 A | 8/1971 | Savage |
| 3,606,730 A | 9/1971 | Clark et al. |
| 3,664,095 A | 5/1972 | Asker et al. |
| 3,666,007 A | 5/1972 | Yoshino et al. |
| 3,713,281 A | 1/1973 | Asker et al. |
| 3,800,515 A | 4/1974 | Asker et al. |
| 3,844,737 A | 10/1974 | Macriss et al. |
| 3,889,742 A | 6/1975 | Rush et al. |
| 3,914,955 A | 10/1975 | McCullough |
| 3,944,658 A | 3/1976 | Yoldas |
| 4,012,206 A | 3/1977 | Macriss et al. |
| 4,014,380 A | 3/1977 | Rush et al. |
| 4,021,590 A | 5/1977 | Vangbo |
| 4,025,668 A | 5/1977 | Norback |
| 4,036,360 A | 7/1977 | Deffeyes |
| 4,040,804 A | 8/1977 | Harrison |
| 4,061,835 A | 12/1977 | Poppe et al. |
| 4,081,024 A | 3/1978 | Rush et al. |
| 4,093,435 A | 6/1978 | Marron et al. |
| 4,109,431 A | 8/1978 | Mazzoni et al. |
| 4,113,004 A | 9/1978 | Rush et al. |
| 4,130,111 A | 12/1978 | Ristic |
| 4,134,743 A | 1/1979 | Macriss et al. |
| 4,140,458 A | 2/1979 | Evert et al. |
| RE29,932 E | 3/1979 | Norback |
| 4,162,934 A | 7/1979 | Norback |
| 4,172,164 A | 10/1979 | Meyer et al. |
| 4,180,126 A | 12/1979 | Rush et al. |
| 4,222,244 A | 9/1980 | Meckler |
| 4,246,962 A | 1/1981 | Norback |
| 4,255,171 A | 3/1981 | Dravnicks |
| 4,290,789 A | 9/1981 | Newton |
| 4,325,220 A | 4/1982 | McFarlin |
| 4,341,539 A | 7/1982 | Gidaspow et al. |
| 4,346,051 A | 8/1982 | McFarlin |
| 4,365,979 A | 12/1982 | Takeyama et al. |
| 4,382,807 A | 5/1983 | Diachuk |
| 4,396,206 A | 8/1983 | Tsuge et al. |
| 4,402,717 A | 9/1983 | Izumo et al. |
| 4,431,456 A | 2/1984 | Kulprathipania |
| 4,432,409 A | 2/1984 | Steele |
| 4,449,992 A | 5/1984 | Yamada et al. |
| 4,460,388 A | 7/1984 | Fukami et al. |
| 4,477,267 A | 10/1984 | Reiss |
| 4,484,938 A | 11/1984 | Okamoto et al. |
| 4,505,976 A | 3/1985 | Doehnert et al. |
| 4,527,398 A | 7/1985 | Schaetzle |
| 4,529,420 A | 7/1985 | Norback |
| 4,540,420 A | 9/1985 | Wharton et al. |
| 4,557,736 A | 12/1985 | Sircar et al. |
| 4,582,129 A | 4/1986 | Yano et al. |
| 4,594,860 A | 6/1986 | Coellner et al. |
| 4,595,403 A | 6/1986 | Sago et al. |
| 4,635,446 A | 1/1987 | Meckler |
| 4,680,248 A | 7/1987 | Roach |
| 4,711,645 A | 12/1987 | Kumar |
| 4,719,761 A | 1/1988 | Cromer |
| 4,723,417 A | 2/1988 | Meckler |
| 4,729,774 A | 3/1988 | Cohen et al. |
| 4,747,346 A | 5/1988 | Geel |
| 4,769,053 A | 9/1988 | Fischer, Jr. |
| 4,808,505 A | 2/1989 | Ueda |
| 4,810,609 A | 3/1989 | Ueda |
| 4,841,733 A | 6/1989 | Dussault et al. |
| 4,859,217 A | 8/1989 | Chao |
| 4,871,607 A | 10/1989 | Kuma et al. |
| 4,875,520 A | 10/1989 | Steele et al. |
| 4,886,769 A | 12/1989 | Kuma et al. |
| 4,911,775 A | 3/1990 | Kuma et al. |
| 4,919,899 A | 4/1990 | Herrmann et al. |
| 4,924,934 A | 5/1990 | Steele |
| 4,948,392 A | 8/1990 | Rush |
| 4,955,205 A | 9/1990 | Wilkinson |
| 4,957,514 A | 9/1990 | Golden et al. |
| 4,959,970 A | 10/1990 | Meckler |
| 4,971,606 A | 11/1990 | Sircar et al. |
| 5,002,116 A | 3/1991 | Hoagland et al. |
| 5,013,334 A | 5/1991 | Maurer |
| 5,026,531 A | 6/1991 | Tannous et al. |
| 5,045,295 A | 9/1991 | Tannous et al. |
| 5,052,188 A | 10/1991 | Komameni et al. |
| 5,059,577 A | 10/1991 | Hatton |
| 5,120,694 A | 6/1992 | Dunne et al. |
| 5,122,403 A | 6/1992 | Roginski et al. |
| 5,125,195 A | 6/1992 | Brede |
| 5,140,450 A | 8/1992 | Nikaido |
| 5,148,374 A * | 9/1992 | Coellner .................... 700/282 |
| 5,152,813 A | 10/1992 | Coe et al. |
| 5,170,633 A | 12/1992 | Kaplan |
| 5,171,333 A | 12/1992 | Maurer |
| 5,176,005 A | 1/1993 | Kaplan |
| 5,203,887 A | 4/1993 | Toussaint |
| 5,238,899 A | 8/1993 | Kadowaki et al. |
| 5,300,138 A | 4/1994 | Fischer et al. |
| 5,373,704 A | 12/1994 | McFadden |
| 5,401,706 A | 3/1995 | Fischer |
| 5,448,895 A | 9/1995 | Coellner |
| 5,496,397 A | 3/1996 | Fischer et al. |
| 5,502,975 A | 4/1996 | Brickley et al. |
| 5,517,828 A | 5/1996 | Calton et al. |
| 5,526,651 A | 6/1996 | Worek et al. |
| 5,542,259 A | 8/1996 | Worek et al. |
| 5,548,970 A | 8/1996 | Cunningham, Jr. |
| 5,551,245 A | 9/1996 | Calton et al. |
| 5,579,647 A | 12/1996 | Calton et al. |
| 5,649,428 A | 7/1997 | Calton et al. |
| 5,650,030 A | 7/1997 | Kyricos |
| 5,650,221 A | 7/1997 | Belding et al. |
| 5,660,048 A | 8/1997 | Belding et al. |
| 5,718,122 A | 2/1998 | Maeda |
| 5,727,394 A | 3/1998 | Belding et al. |
| 5,732,562 A | 3/1998 | Moratalla |
| 5,758,508 A | 6/1998 | Belding et al. |
| 5,758,509 A | 6/1998 | Maeda |
| 5,758,511 A | 6/1998 | Yoho et al. |
| 5,761,915 A | 6/1998 | Rao |
| 5,771,707 A | 6/1998 | Lagace' et al. |
| 5,782,104 A | 7/1998 | Sami et al. |
| 5,791,153 A | 8/1998 | Belding et al. |
| 5,817,167 A | 10/1998 | DesChamps |
| 5,826,434 A | 10/1998 | Belding et al. |
| 5,839,288 A | 11/1998 | Dotson |
| 5,860,284 A | 1/1999 | Goland et al. |
| 5,890,372 A * | 4/1999 | Belding et al. ................ 62/271 |
| 5,937,667 A | 8/1999 | Yoho, Sr. |
| 5,937,933 A | 8/1999 | Steele et al. |
| 5,943,874 A | 8/1999 | Maeda |
| 5,953,926 A | 9/1999 | Dressler |
| 5,966,955 A | 10/1999 | Maeda |
| 6,003,327 A | 12/1999 | Belding et al. |
| 6,016,710 A * | 1/2000 | Boles et al. ............... 73/861.42 |
| 6,018,953 A | 2/2000 | Belding et al. |
| 6,029,462 A | 2/2000 | Denniston |
| 6,029,467 A | 2/2000 | Moratalla |
| 6,050,100 A * | 4/2000 | Belding et al. ................ 62/271 |
| 6,094,835 A | 8/2000 | Cromer |
| 6,155,060 A | 12/2000 | Parkman |
| 6,199,388 B1 | 3/2001 | Fischer, Jr. |

| | | | |
|---|---|---|---|
| 6,199,389 B1 | 3/2001 | Maeda | |
| 6,199,394 B1 | 3/2001 | Maeda | |
| 6,205,797 B1 | 3/2001 | Maeda | |
| 6,311,511 B1 | 11/2001 | Maeda | |
| RE37,464 E | 12/2001 | Meckler | |
| 6,328,095 B1 | 12/2001 | Felber et al. | |
| 6,355,091 B1* | 3/2002 | Felber et al. | 95/10 |
| 6,505,502 B1* | 1/2003 | Brownell et al. | 73/37 |
| 6,751,964 B2 | 6/2004 | Fischer | |
| 2004/0000152 A1 | 1/2004 | Fischer | |
| 2004/0145324 A1* | 7/2004 | Ross et al. | 318/254 |
| 2005/0252229 A1* | 11/2005 | Moratalla | 62/271 |
| 2005/0262862 A1* | 12/2005 | Moffitt | 62/271 |

FOREIGN PATENT DOCUMENTS

| | | |
|---|---|---|
| EP | 0030863 | 6/1981 |
| GB | 1551647 | 8/1979 |
| JP | 54-019548 | 2/1979 |
| JP | 55-003801 | 1/1980 |
| JP | 06-063344 | 3/1994 |
| JP | 08-014600 | 1/1996 |
| JP | 2002-081688 | 3/2002 |

OTHER PUBLICATIONS

"Affordable Fresh Air is Now a Reality with Exclu-Sieve™ Total Energy Recovery," 1-page advertisement, Semco Mfg., Inc., undated.
"Air exchanger eliminates cross contamination in animal lab." Reprint from Consulting-Specifying Engineer, 1 page, Jan. 1990.
"Davison 5A Molecular Sieves," Davison Chemical Division of Grace, 4 pages, undated.
"Davison Silica Gels," Introduction to Silica Gel and Silica Gel Application Guide (3 pages), undated.
"Ethanol Drying Using Davison Molecular Sieves," Davison Chemical Division of Grace, pp. 3-4, undated.
"Exclu-Sieve™—Design and Selection Manual—The Semco Air System," Semco Mfg., Inc., 11 pages, 1991.
"Exclu-Sieve™—Heat Wheel Retrofit Program—The Semco Air System," Semco Mfg., Inc., 6 pages, 1991.
"Exclu-Sieve™—Packaged Energy Recovery Systems—The Semco Air System," Semco Mfg., Inc., 33 pages, 1991.
"Exclu-Sieve™—Total Energy Recovery Systems—The Semco Air System," Semco Mfg., Inc., 8 pages, 1991.
"Exclu-Sieve™ Design Solutions: Animal and Chemical Research Laboratories," Bulletin 504, Issue 1, Semco Mfg., Inc., 4 pages, Jul. 1989.
"Finally, Superior Technology Makes Quality Indoor Air Affordable," Semco Incorporated, 1-page advertisement, undated.
"IAQ and Office Buildings: An Exclu-Sieve™ Solution," ASHRAE Journal's Supplier Capabilities Supplement, pp. S-44 and S-45, Aug. 1990.
"Indoor Air Quality—A Fresh Solution," 1-page advertisement, Semco Mfg., Inc., undated.
U.S. Dept. of Energy, "Federal Technology Alerts—Two—Wheel Desiccant Dehumidification System", Apr. 1997.
"Molecular Sieves—Siliporite," p. 4, undated.
"Molecular Sieves Manufactured by Davison Chemical," p. 6, undated.
"Semco Exclu-Sieve™—Application Bulletin 508," Semco Mfg., Inc., 2 pages, 1991.
"Semco Exclu-Sieve™—Application Case History Bulletin 506," Semco Mfg., Inc., 2 pages, 1991.
"Semco Exclu-Sieve™—Application Case History Bulletin 507," Semco Mfg., Inc., 2 pages, 1991.
"Semco Exclu-Sieve™—Technical Bulletin 509," Semco Mfg., Inc., 2 pages, 1991.
"Senex energy—Cargocaire Bulletin 3315." Cargocaire Engineering Corporation, 6 pages; May 1985.
"Senex Enthalpy Recovery Technical Manual," Cargocaire Engineering Corporation, 28 pages; Oct. 1984.
"Union Carbide Molecular Sieves," p. 4, undated.
The Dehumidification Handbook, published by Cargocaire Engineering Corporation, 103 pages, copyright 1982, fourth printing Nov. 1984.
ASHRAE™ Standard 62-1989—Ventilation for Acceptable Indoor Air Quality, American Society of Heating, Refrigerating and Air-Conditioning Engineers, Inc., pp. 1, 6-12, 15.
C. Bayer et al., "Results of Chemical Cross-contamination Testing of a Total Energy Recovery Wheel-Phase I," Georgia Institute of Technology, 9 pages, Jun. 5, 1991.
C. Downing, "No Place Like Home," Engineered Systems, 1996.
C. Downing, "Tech Brief #15—Desiccant Air-Conditioning," Industrial Energy Extension Service of Georgia Tech, 4 pages, 1989.
Chris Downing, P.E., Semco Incorporated, "Independent Performance Verification of SEMCO's Total Energy Recovery Wheels", Part 1—Test Facility & Procedure, Georgia Instit.
D.W. Breck, Zeolite Molecular Sieves, pp. 3, 4, and 636, undated.
Energy Recovery Equipment and Systems, Smacna, Inc., p. 6.5, Jul. 1978.
Hawley's Condensed Chemical Dictionary, entry for "molecular sieve," pp. 792-793 (11th edition), 1987.
James C. Smith, "Schools Resolve IAQ/Humidity Problems with Desiccant Preconditioning, Heating/Piping/Air Conditioning", Apr. 1996.
James F. Swails, Leon M. Hobbs, III, and Douglas A. Neal, "A Cure For Growing Pains," Consulting/Specifying Engineer, Jun. 1997.
Methods of Dehumidification, Cargocaire Engineering Corporation handbook, pp. 3-17 and 3-18, undated.
Robert DiBlasio, "Desiccants In Hospitals—Conditioning a Research Facility," Engineered Systems, Sep. 1995.
Semco Incorporated, "Energy Recovery Wheel Technical Guide", 2003.
Semco Incorporated, Energy Recovery Products, 1998.
Semco Incorporated, Semco Incorporated Desiccant Wheel Products; Pinnacle Primary Ventilation System Technical Guide, 1999.

* cited by examiner

BUILDING, VENTILATION SYSTEM, AND RECOVERY DEVICE CONTROL

FIELD OF INVENTION

This invention relates to heating, ventilating, and air-conditioning (HVAC) systems and methods, buildings having such systems, and in particular embodiments, to ventilation and exhaust systems having recovery wheels, and controls for such systems.

BACKGROUND OF THE INVENTION

Heating, ventilating, and air-conditioning (HVAC) systems have been used to maintain desirable temperatures and humidity levels within buildings, and buildings have been constructed with ventilation systems including HVAC systems to provide comfortable and safe environments for occupants to live and work. To maintain fresh air within buildings and to reduce the level of indoor air contaminants, in many applications, at least a portion of the air handled by ventilation or HVAC systems has been taken from outdoors, while a portion of the indoor air handled by HVAC systems has been exhausted to outside the building. In many applications, particular sources of contaminants within buildings are located near exhaust vents or hoods so that a high percentage of the contaminants produced are exhausted by the ventilation systems out of the building.

However, in most situations, outside air introduced to the building to replace exhaust air must be cooled or heated before being introduced to the building to provide temperatures within desired parameters, and often must be dehumidified or humidified in order to keep humidity levels within desired ranges. But adding or removing heat or humidity (moisture) typically involves the expenditure of energy. To reduce the energy required to condition the outside air, recovery wheels have been used to transfer heat, moisture, or both, between exhaust air and incoming outside air. Examples of the prior art in these areas are described in U.S. Pat. Nos. 4,769,053 and 6,199,388, and U.S. Patent Application publication number 2004/0000152, all by the same inventor as this document, and all of which are incorporated herein by reference in their entirety. These prior art documents also describe many of the needs and benefits of such systems and the use of recovery wheels.

When a recovery wheel is used, air may be exchanged from one side of the wheel to the other. In applications where exhaust air may be highly contaminated, such as exhaust from a laboratory hood or a source of contaminants, it may be desirable that the exhaust air, and contaminants therein, not be permitted to transfer in large or significant quantities into the outside air or supply air that is to be introduced into the building. To accomplish this, the pressure of the outside air may he higher than the pressure of the exhaust air at the recovery wheel, and a portion of the outside air may be diverted to purge the return or exhaust air from a portion of the rotating recovery wheel before that portion passes from the return/exhaust side of the wheel to the outside/supply air side of the wheel. A portion of the outside air may be diverted to form purge air using a baffle plate, for example, which may be made of sheet metal, for instance. The baffle plate or purge section of the recovery wheel typically uses the pressure differential between the outside/supply airstream and the return/exhaust airstream, to force high velocity, unconditioned, clean outside air through the wheel media as it rotates from the dirty return/exhaust airstream into the clean outside/supply airstream.

In this way, some or all of the exhaust air contaminants that would otherwise be trapped within the volume of the wheel transfer media as it rotates from the contaminated airstream into the clean airstream are forced or directed back into the return air steam and subsequently exhausted outdoors. As a result, the air that is contained within the transfer media, as it passes into the outside/supply airstream, may be substantially uncontaminated, clean air.

FIGS. 1a and 1b illustrate an example of a purge section as it has been employed in the prior art. In the side view of FIG. 1a, recovery wheel 10 rotates about axle 11 in the direction shown, transferring heat, moisture, or both, between return/exhaust airstream 16 and outside/supply airstream 14. Outside/supply airstream 14 starts in the supply system as outside air 14a, typically from outside the building, some of which is diverted through purge section 12 into return/exhaust airstream 16, forming purge flow 14c. Except for purge airflow 14c, outside air 14a becomes supply air 14b after being at-least partially conditioned by passing through recovery wheel 10. Return/exhaust airstream 16 in the exhaust system is return air 16a upstream of recovery wheel 10 and becomes exhaust air 16b after passing through recovery wheel 10 and receiving purge airflow 14c. Return/exhaust airstream 16 includes contaminants 18, in this example, which may be harmful or unpleasant contaminants, for instance. Absent purge section 12, the rotation of wheel 10 would tend to carry some contaminants 18 into outside/supply airstream 14, but with purge section 12, purge airflow 14c removes these contaminants 18 from wheel 10 and returns them (along with purge airflow 14c) to return/exhaust airstream 16. Outside/supply airstream 14 and return/exhaust airstream 16 (and the supply and exhaust systems) are separated by duct wall 15 in this illustration.

FIG. 1b is an end view of the recovery wheel 10 of FIG. 1a, illustrating purge angle 19 of purge section 12. Provided that the system pressurization is set appropriately, the purge angle 19 is correctly selected, and the appropriate purge pressure is maintained, any cross-contamination associated with air trapped within the transfer media of wheel 10 has been limited to or below 0.045% of the return air 16a concentration of contaminant 18 for certain recovery wheels 10. This carry-over percentage is well below a 0.1% level of short circuiting frequently observed as a result of normal re-entrainment between the exhaust outlet and outside air intake of well-designed facilities such as laboratories.

Even with recovery devices such as recovery wheels (e.g., 10), HVAC systems still use a considerable amount of energy, including both for moving air (fan power) and further conditioning of supply air 14b. To further reduce energy consumption, HVAC systems have been developed that reduce airflow when less flow is needed (variable air-volume systems). In many applications, variable-frequency drive systems have been provided for fan motors, with variable-speed controllers, to reduce fan speeds when full air volume is not needed. Variable voltage DC drives are another option. In some cases, a number of fans are used, and a portion of the fans are shut off when less flow is needed rather than (or in addition to) varying the speed of the fans. Variable air-volume systems have been used that reduce fan power required, that reduce the volume of outside air that must be conditioned, or both. But problems have been encountered when variable air-volume systems have been used in conjunction with recovery systems and devices such as recovery wheel 10.

Specifically, applying energy recovery wheels and maintaining acceptable contaminant carry-over levels in variable air-volume systems has shown to be rather difficult due to changes in system pressures, airflows, or both. Without a way to ensure effective purge operation, cross-contamination has resulted from 3% to as high as 20% of the exhaust air concentration for variable airflow systems incorporating energy recovery wheels. High carry-over percentages have resulted when the quantity of contaminated air transferred increases due to a reduction in the purge airflow (and thereby purge efficiency), for example, at the same time that the supply airflow is being reduced.

For applications such as research laboratories, hospitals, smoking areas and those involving toilet exhaust, just to name a few, a problem has existed that this level of cross-contamination is unacceptable. Therefore, a need or potential for benefit has existed for effective purge operation in variable air-volume systems. In fact, needs or potential for improvement have existed so that an industry standard for these types of applications can be reached that may be as stringent as 0.1%, with laboratory applications often desiring 0.01%. Thus, and for reasons that will become apparent, systems and methods to better ensure effective purge operation for energy recovery wheel systems operated with variable airflow volume (without requiring excessive purge airflow at the peak airflow design conditions) is a top priority for many end users and mechanical consultants.

In a partial solution to this problem, purge angle 20 has been set for worst-case conditions, typically for minimum flow, minimum pressure differential between outside/supply airstream 14 and return/exhaust airstream 16, or both. However, this results in excessive (more than needed) purge airflow 14c under other conditions, for example, at higher flow. Excessive purge airflow 14c not only increases fan power that is required, but also reduces the effectiveness of recovery wheel 10 at transferring heat, moisture, or both, between return/exhaust airstream 16 and outside/supply air 14. Thus, needs or potential for benefit exist to provide for appropriate purge flow (sufficient but not excessive). Needs or potential for benefit exist in a ventilation system, to maintain purge effectiveness, limit carry-over of contaminants, and yet limit (e.g., to what is necessary) or minimize purge airflow. Needs or potential for benefit exist to control recovery systems such as recovery wheels, control ventilation systems, modify existing ventilation systems, provide control systems for recovery wheels and ventilation systems, provide ventilation systems, and provide buildings with ventilation systems that maintain purge effectiveness, limit carry-over of contaminants, and yet limit or minimize purge airflow.

Due to the increasing cost of electricity, the desire to reach energy efficiency, needs or desire for compliance with energy codes and standards (e.g., ASHRAE 90.1) many facilities would benefit from the ability to incorporate variable air-volume distribution systems. If this problem of purge inefficiency is not effectively addressed, many applications that could benefit significantly from the use of recovery wheels will not be able to do so since even 3% carry-over is often considered to be unacceptable in certain applications. Potential for improvement exists in these and other areas that may be apparent to a person of skill in the art having studied this document.

SUMMARY OF PARTICULAR EMBODIMENTS OF THE INVENTION

This invention provides, among other things, methods of controlling a recovery wheel in a ventilation system, methods of controlling a ventilation system to reduce energy consumption, methods of reducing energy consumption of a ventilation system, methods of modifying a ventilation system to reduce energy consumption, control systems for recovery wheels, ventilation systems for ventilating an at-least partially enclosed space, and buildings having certain ventilation systems.

Various embodiments of the invention provide as an object or benefit that they partially or fully address one or more of the needs, potential areas for improvement or benefit, or functions described herein, for instance. Specific embodiments provide as an object or benefit, for instance, that they at-least partially provide for control of recovery systems or devices such as recovery wheels, provide control of ventilation systems which may be new or existing systems, or provide ventilation systems or buildings with ventilation systems that maintain purge effectiveness, limit carry-over of contaminants, and yet limit or minimize purge airflow.

The invention provides various embodiments that provide for control of a recovery system or device such as a recovery wheel by controlling a parameter such as the speed of the recovery wheel as a function of pressure, differential pressure, flow rate, fan speed, or a combination thereof, as examples. Some embodiments include, or are utilized in, a variable air-volume system, which may comprise one or more variable-speed drive systems, variable-speed controller(s), or the like. In some embodiments, a purge angle is set for a maximum flow rate and recovery-wheel speed is reduced at lower flows. And in some embodiments, temperature, humidity, or both, are also measured, and recovery-wheel speed is also controlled as a function of these measurements. Systems may utilize sensors or input devices, digital controllers, and the like, and ventilation systems may include outside/supply air systems, return/exhaust air systems, recovery devices, purge systems, controllers, fans, or a combination thereof.

In specific embodiments, this invention provides methods of controlling a recovery wheel in a ventilation system. These methods include at least the step of controlling at least one parameter of the recovery wheel as a function of a pressure, a pressure differential, a flow rate, or a fan speed, or a combination thereof, within the ventilation system.

In some such embodiments, the step of controlling at least one parameter of the recovery wheel includes changing the parameter to provide appropriate purge flow through the recovery wheel to maintain purge effectiveness and limit the carry-over of contaminants from a return/exhaust airstream to an outside/supply airstream, for example, in a variable air-volume ventilation system. In addition, in some embodiments, the step of controlling at least one parameter of the recovery wheel includes controlling the rotational speed of the recovery wheel. Furthermore, some embodiments include a step of measuring at least one variable (e.g., a pressure, a pressure differential, a flow rate through the recovery wheel, or a combination thereof) and the step of controlling the at-least one parameter includes changing the rotational speed of the recovery wheel as a function of the measurement of that (at least one) variable.

In some embodiments, the step of measuring at least one variable includes measuring a first set of measurements or a second set of measurements (or both), over a period of time, wherein the first set of measurements includes a first pressure and a second pressure, and the second set of measurements includes a pressure differential between the first pressure and the second pressure. Such an embodiment may further include a step of calculating an initial purge angle for the recovery wheel using the (at least one) variable measured over a period of time. Further, some embodiments further include a step of alarming if at least one variable is outside of at least one acceptable range.

Still further, some embodiments further include steps of measuring a temperature, a humidity, or both, and controlling the rotational speed of the recovery wheel as a function of the temperature, the humidity, or an enthalpy, for example, calculated using the temperature and the humidity. Some embodiments include steps of computing recovery efficiency, energy savings resulting from use of the recovery wheel, or both, and saving real time recovery efficiency data, real time energy savings data, average recovery efficiency data, total energy savings data, or a combination thereof, over a period of time.

Such methods of controlling a recovery wheel in a ventilation system may be part of a method of controlling a ventilation system to reduce energy consumption, which may include the steps of varying at least one airflow rate within the ventilation system based on a need for ventilation at the time, and controlling a recovery wheel in the ventilation system in accordance with one or more of the embodiments described above. In some of these embodiments, the speed of the recovery wheel is controlled, and the recovery wheel turns faster when the airflow rate is higher. And in some particular embodiments, the rotational speed of the recovery wheel is substantially proportional to the airflow rate. Some such embodiments further include a step of setting a purge angle of the recovery wheel for a high-flow condition, and reducing the wheel speed for flow conditions having airflows lower than the high-flow condition.

Further, these methods of controlling a recovery wheel in a ventilation system may be part of a method of modifying a ventilation system to reduce energy consumption. In such embodiments, the ventilation system may have at least one fan and at least one recovery wheel, and the method may include the steps of obtaining or providing a variable-frequency drive for at-least one fan of the ventilation system, obtaining or providing a controller for the variable-frequency drive configured to vary the fan speed based on a need for ventilation, and obtaining, providing, or configuring a controller for the recovery wheel in the ventilation system to control the recovery wheel in accordance with one or more of the embodiments described above. Some of these embodiments further include a step of installing or having installed at least one sensor for measuring a pressure, a pressure differential, a flow rate through the recovery wheel, or a combination thereof, and the step of controlling at least one parameter may include controlling the parameter as a function of at least one measurement of the sensor. In addition, some such embodiments further include one or more other steps described herein.

In another set of embodiments, the invention provides a control system for a recovery wheel having a variable-speed drive system configured to turn the recovery wheel at a variable speed. In these embodiments, the control system may include at least one first input device configured to provide at least one first input signal corresponding to a pressure, a pressure differential, an airflow rate, a fan speed, or a combination thereof. These embodiments may also include a digital controller configured to receive at least one first input signal and calculate a first speed-control signal for the variable-speed drive system that changes as a function of the first input signal, for instance, to maintain purge effectiveness and limit carryover of contaminants from a return/exhaust airstream to an outside/supply airstream. Some embodiments further include at least one second input device configured to provide at least one second input signal corresponding to a temperature, a humidity, or both, and the digital controller may be configured to receive the second input signal and calculate a second speed-control signal for the variable-speed drive system. In various such embodiments, the second speed-control signal may change as a function of (at least one) second input signal, and the digital controller may be configured to select the lesser speed between the first speed-control signal and the second speed-control signal and provide that lesser speed to the variable-speed drive system.

In yet another set of embodiments, the invention also provides a ventilation system, for instance, for ventilating an at-least partially enclosed space. This ventilation system embodiment may include a supply system configured to draw air from outside the space and form a stream of supply air (an outside/supply airstream) for delivery to the space, and an exhaust system configured to draw air from within the space and form a stream of exhaust air (a return/exhaust airstream) for disposal outside the space, and the supply system, the exhaust system, or both, may be a variable air-volume system. These ventilation system embodiments may also include a recovery device configured to transfer heat, moisture, or both, between the stream of exhaust air and the stream of supply air, and a purge system for purging contaminants from the recovery device by passing a purge stream through at least part of the recovery device. These embodiments may also include a controller configured to control at least one parameter as a function of changes in the air volume to provide appropriate purge flow through the recovery device to maintain purge effectiveness and limit carry-over of contaminants from the stream of exhaust air to the stream of supply air.

In particular embodiments, the ventilation system may also include an outside air fan having a variable-speed drive system, an exhaust fan having a variable-speed drive system, and a recovery wheel having a variable-speed drive system. The recovery device controller may be configured to control the speed of the recovery wheel in response to changes in pressure, pressure differential, airflow rate, fan speed, or a combination thereof, in some such embodiments. In particular embodiments, the recovery device controller may be configured to control the speed of the recovery wheel in response to changes in pressure, pressure differential, airflow rate, or a combination thereof. And in some embodiments, the ventilation system further includes the first input device(s) and digital controller described above. Further, in certain embodiments, the ventilation system further includes the second input device(s) described above and the digital controller is configured as described above to provide the lesser speed to the variable-speed drive system.

In even another set of embodiments, the invention provides a building that includes at least one embodiment of the ventilation system, control system, or both described above, and the building may further include the at-least partially enclosed space described above in some embodiments. And in still another set of embodiments, the invention provides various methods of reducing energy consumption of a ventilation system, that involves utilizing a rotating recovery wheel to transfer at least one of heat and moisture between a return/exhaust airstream and an outside/supply airstream, and also involves utilizing and controlling at least one variable-speed drive system to vary a speed of at least one fan within the ventilation system to vary at least one airflow rate within the ventilation system based on a need for ventilation at the time. These embodiments often also include providing appropriate purge flow through the recovery wheel as the airflow rate varies to maintain purge effectiveness and limit carry-over of contaminants from the return/exhaust airstream to the outside/supply airstream at lower airflow rates while avoiding excessive purge flow at higher airflow rates. Some embodiments of these methods may also include other steps described above. Other embodiments of the invention include various combinations of the features and limitations described herein.

Figure 1A:
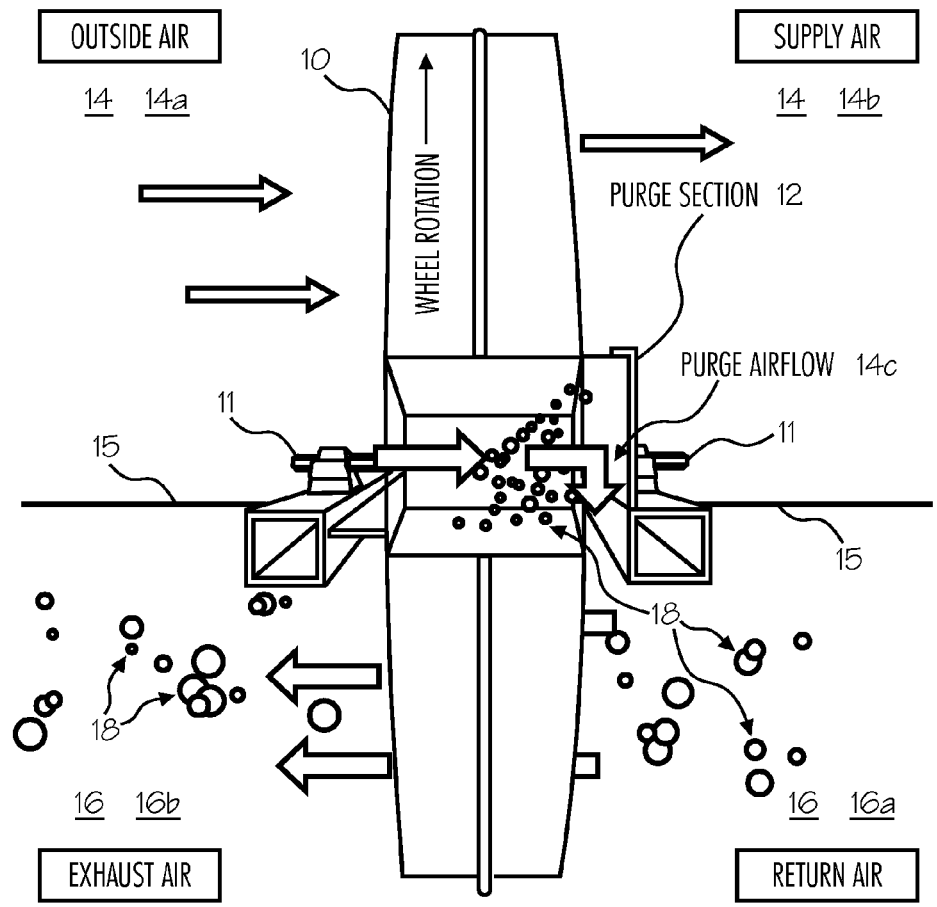
FIG. 1a is a perspective side view of a recovery wheel illustrating, among other things, an outside/supply airstream, a contaminated return/exhaust airstream, and a purge structure to reduce the transfer of contaminants from the return/exhaust airstream to the outside/supply airstream.
Figure 1B:
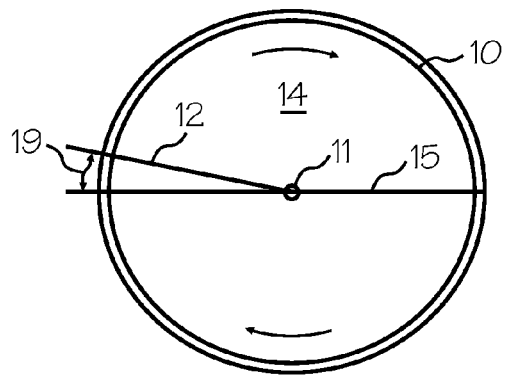
FIG. 1b is an end view of the recovery wheel of FIG. 1a illustrating, among other things, a purge angle of a recovery wheel.

The drawings illustrate, among other things, various particular examples of embodiments of the invention, and certain characteristics thereof. Different embodiments of the invention include various combinations of elements shown in the drawings, described herein, known in the art, or a combination thereof.

DETAILED DESCRIPTION OF EXAMPLES OF EMBODIMENTS

In a number of embodiments, this invention provides improvements to heating, ventilating, and air-conditioning (HVAC) systems and methods, buildings having such systems, and in many embodiments, to exhaust systems having recovery wheels, and controls for such systems, as examples. Various embodiments include, for instance, control systems for recovery wheels, ventilation systems for ventilating an at-least partially enclosed space, buildings having particular ventilation systems, control systems, or the like, methods of controlling a recovery wheel in a ventilation system, methods of reducing energy consumption of a ventilation system, methods of controlling a ventilation system to reduce energy consumption, and methods of modifying a ventilation system to reduce energy consumption.

The invention provides various embodiments that provide for control of a recovery system or device such as a recovery wheel by controlling a parameter as a function of pressure, differential pressure, flow rate, fan speed, or a combination thereof, for example. In some embodiments, this parameter is the speed of the recovery wheel, for instance. Some embodiments include, or are used with, a variable air-volume system, which may include one or more variable-speed drive systems, variable-speed controller(s), or the like. In some embodiments, a purge angle is set for a maximum flow rate (and thereby purge pressure) and recovery-wheel speed is reduced at lower flows, for instance. In addition, in some embodiments, temperature, humidity, or both, are also measured, and recovery-wheel speed is also controlled as a function of these measurements. Systems may utilize sensors or input devices, digital controllers, and the like, and ventilation systems may include supply systems, exhaust systems, recovery devices, purge systems, controllers, fans, or a combination thereof, as examples.

In various particular embodiments, the invention provides various apparatuses and control methods, among other things, to provide desirable and appropriate purge efficiency of an energy recovery wheel when installed to operate within a variable air-volume system or constant-volume, variable-pressure system, for example. In certain embodiments, by measuring the pressure differential across the purge section, air volume through the recovery wheel or both, as examples, the speed of the recovery wheel may be modulated to provide desired purge efficiency as the airflow, and thereby pressures through the system, change. In some embodiments, the resulting purge airflow at a preset, fixed purge angle, for instance, is matched with a calculated wheel rotational speed to limit carry-over of contaminants from the return/exhaust to the outside/supply airstream while simultaneously maintaining a desired high level of sensible and total recovery efficiency. In various embodiments, the apparatus and control method also allows for seamless integration of temperature or enthalpy control to avoid over recovery, establish summer-to-winter changeover, and avoid frost formation, as examples, while still functioning as a purge control method that maintains adequate purge flow. In some embodiments, the invention also allows for an alarm feature to guard against seal leakage in the incorrect direction (i.e., return/exhaust to outside/supply), the ability to calculate and report airflow through the recovery wheel, the ability to calculate and accumulate energy savings, to report recovery efficiency and to automatically calculate the appropriate purge angle for the service technician, as examples.

In various embodiments, this invention avoids the extreme contaminant carry-over levels experienced by certain variable volume systems designed to include energy recovery wheels were the purge angle is chosen for the design, full flow, maximum purge pressure condition, for example. Certain embodiments also avoid excessive purge airflow, high parasitic fan energy and increased horsepower requirements associated with variable volume systems that include energy recovery wheels were the purge angle is chosen for the minimum flow, minimum purge-pressure condition, as another example.

Referring now to FIGS. 1a to 2e, as mentioned, many of the embodiments relate to the use of a recovery device, for example, recovery wheel 10, in a variable air-volume HVAC or ventilation system, for instance. Next, some of the problems associated with use of a recovery wheel in a variable air-volume system, and various aspects of the invention, including aspects relating to obtaining purge efficiency for energy wheel systems operated with variable airflow volume will be described by reviewing a particular example of such a system. This example represents a typical laboratory application with the design airflow being modulated down to 20% of its maximum flow capability, for instance, in order to compensate for changes in building heating/cooling loads and closed fume hoods, for example. This example is for a variable volume laboratory system air handling system that incorporates a total energy recovery wheel 10 (i.e., a recovery wheel that transfers both heat and moisture) that has diameter of approximately 10 feet. The recovery wheel 10 of this example has a net transfer area of 33 square feet per side, the system is designed to supply 26,400 cfm at the maximum flow condition, the system exhausts 23,760 cfm, (10% less exhaust for pressurization of labs), and, as mentioned, the system airflows are modulate down to 20% of the maximum quantities. The system ductwork includes control valves to control space pressurization, and the control valves maintain a minimum of 1" of external static pressure within the ductwork in this example.

During building occupancy, but when some hoods are not in use, the minimum supply air 14b flow condition may modulate as low as 40% of the max flow condition (10,560 cfm) and at any flow condition in between it and the system maximum (26,400 cfm). When the building 29 is at minimum occupancy and with all hood sashes lowered, the supply air 14b flow can go as low as 5,280 cfm, 20% of the max condition. In this example, it will be assumed that at all flow conditions, both the health and safety officer and code requirements (NFPA 45) dictate that the purge efficiency of the wheel 10 be such that any carry-over of contaminants 18 from the return/exhaust airstream 16 to the outside/supply airstream 14 be limited to less than 0.045% of the concentration contained within the return/exhaust airstream 16. At this level, the carry-over will be below the 0.1% that is generally accepted as resulting from normal re-entrainment between the exhaust air 16b outlet and fresh or outside air 14a inlet of well-designed HVAC systems.

Figure 2A:
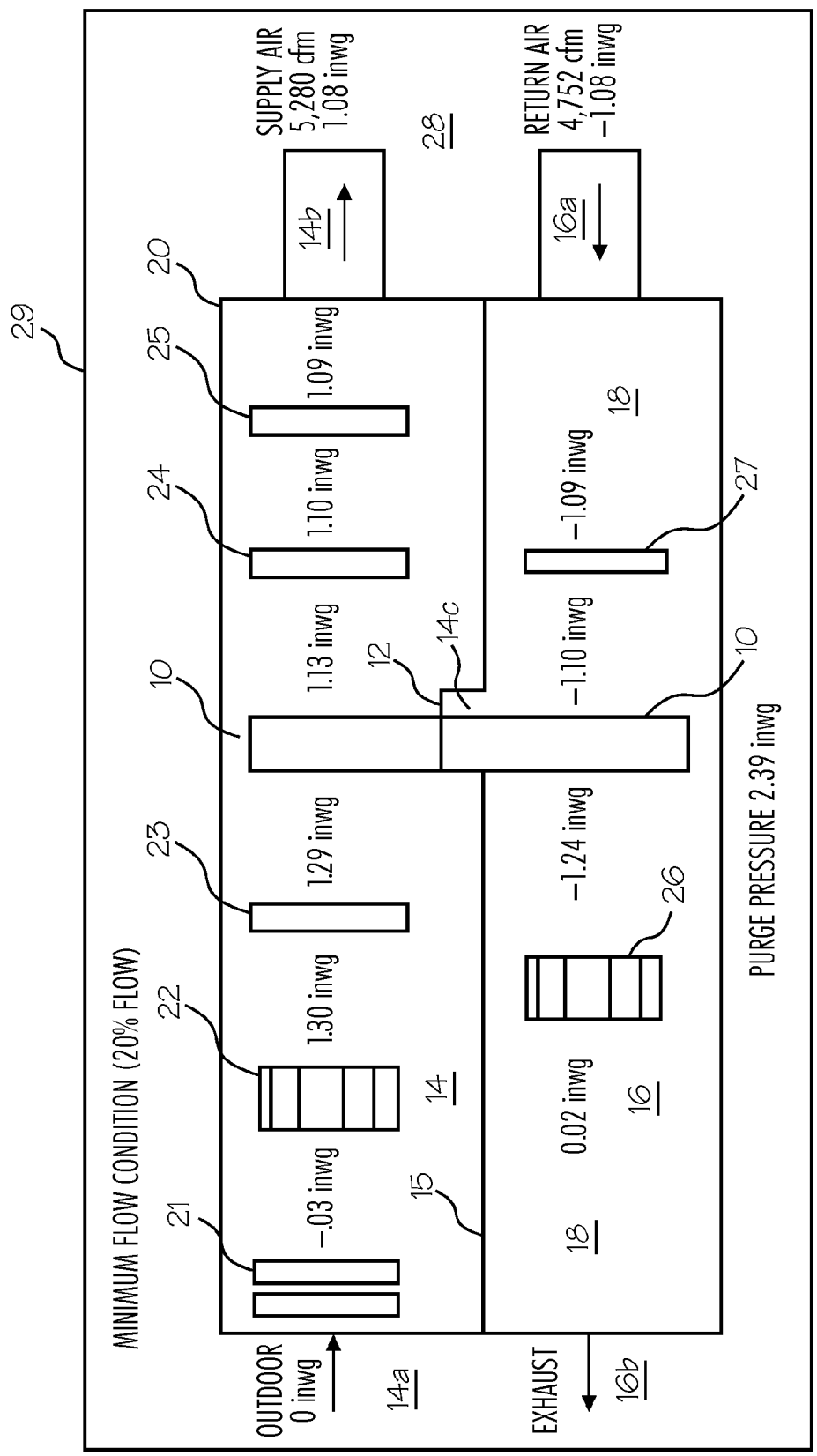
FIG. 2a is a block diagram illustrating a building containing a ventilation system having, among other things, an outside air fan, an exhaust fan, and a recovery wheel, and providing pressures, in inches of water, at various locations within the ventilation system at a minimum flow condition of 20% of maximum flow.

In this example, in order to ensure that the required purge efficiency is maintained under all conditions, an appropriate purge angle 19 is selected. In this example, the purge angle selection is a function of the "minimum" purge driving pressure differential. This pressure differential may be determined (e.g., estimated and eventually field measured) by carefully investigating the resulting system static (and dynamic in some embodiments) pressures around the recovery wheel 10 at the minimum airflow and duct external static pressure conditions. Static pressures used for this example at minimum flow are shown in FIG. 2a, which also shows the arrangement of certain components in this example of a ventilation system 20 and of a building 29. Specifically, ventilation system 20 includes a supply fan or outside air fan 22, recovery wheel 10, purge section 12, and exhaust fan 26, among other things. Building 29 includes ventilation system 20 and space 28 (not shown to scale). Space 28 may be fully or partially (at-least partially) enclosed by building 29 in many embodiments. It should be noted that in the embodiment illustrated, exhaust 16b exits building 29 adjacent to where outside air 14a enters building 29, but in many embodiments, the exit of exhaust 16b and the entrance to outside (or outdoor) air 14a may be separated by a significant distance, for example, to prevent or minimize contaminants 18 within exhaust air 16b from joining outside air 14a.

In the embodiment illustrated, ventilation system 20 also includes outdoor or outside air damper and filter 21, preheating hot water or steam coil 23, cooling coil 24, heating coil 25, and return/exhaust air filter 27, as examples of other components of ventilation system 20. Other embodiments may have other components, may have a portion of these components, or components may be arranged differently. The pressure loss across damper and filter 21 may change, for example, with filter loading, and in many embodiments pressure changes may be tracked and adjustments may be made.

Several embodiments of the invention include a ventilation system for ventilating an at-least partially enclosed space. Ventilation system 20 is an example of such a ventilation system, and space 28 is an example of an at-least partially enclosed space, which in this embodiment, is at-least partially enclosed by building 29. Ventilation system 20, in this embodiment, includes a supply system (e.g., outside/supply airstream 14 system) configured to draw air (e.g., outside air 14a) from outside the space 28 and form a stream of supply air (e.g., 14 or 14b) for delivery to the space 28, and an exhaust system (e.g., return/exhaust airstream 16 system) configured to draw air (e.g., return air 16a) from within the space 28 and form a stream of exhaust air (e.g., 16 or 16b) for disposal outside the space 28 (e.g., outside building 29). In many embodiments of ventilation system 20, the supply system, the exhaust system, or both, are variable air-volume systems. In various embodiments, one or both of fans 22 and 26 are driven by one or two variable-speed drives having variable-speed controllers, for example, which may be variable-frequency drives or controllers, for example.

Ventilation system 20 also includes a recovery device (e.g., wheel 10) configured to transfer heat, moisture, or both, between return/exhaust airstream 16 and outside/supply airstream 14, and a purge system or structure 12 for purging contaminants 18 from the recovery device (e.g., wheel 10) by passing a purge stream 14c through at least part of the recovery device (e.g., wheel 10). These embodiments also include a controller configured to control at least one parameter as a function of changes in the air volume to provide appropriate purge flow through the recovery device to maintain purge effectiveness and limit carry-over of contaminants from the stream of exhaust air to the stream of supply air. Various embodiments of such a controller will be described in more detail below.

Some embodiments of the invention include a building that has at least one embodiment of the ventilation system, control system, or both described herein. An example of such a building is building 29 shown in FIGS. 2a-2e which includes ventilation system 20 described herein. In this embodiment, building 29 also includes at-least partially enclosed space 28 that ventilation system 20 services. Other embodiments of buildings in accordance with the invention include various combinations of the features and limitations described herein. Buildings in accordance with the invention may include laboratories, industrial buildings, factories, manufacturing facilities, research facilities, office buildings, apartment buildings, residential buildings, schools, libraries, warehouses, garages, tunnels, or the like, as examples. Buildings may include, besides ventilation or HVAC systems, plumbing, lighting, hoods, walls, windows, one or more floors, roofs, elevators, stairs, insulation, wiring, communications systems, columns, structure, etc., as examples.

Turning now specifically to FIG. 2a, the strategy used in particular embodiments is to size and set the purge angle 19 to function effectively at the lowest purge pressure differential conditions (e.g., minimum airflow) and accept an excessive purge airflow at higher flow conditions. This is done in particular embodiments since the air that purges wheel 10 of contaminated air (contaminants 18) is driven mainly by the pressure differential between (in the purge arrangement of this example) the outside air 14a entering wheel 10 and the return air 16a entering wheel 10. Since this purge pressure differential will typically be the lowest at the minimum airflow (e.g., of outside/supply airstream 14, return/exhaust airstream 16, or both), in this example, the setting of the adjustable purge angle (e.g., 19 shown in FIG. 1b) may be chosen to operate effectively even with this minimum purge pressure.

In the minimum airflow condition of this example, the purge pressure differential at the 20% flow condition (FIG. 2a) will be approximately 2.5 inches of water gauge (inwg), which may be measured with a U-tube partially filled with water, for example. Once this purge pressure is know, the purge angle 19 required may be determined in some embodiments, for instance, from the recovery wheel manufacture's catalogued data. For this example, it will be calculated as follows. The wheel 10 has 33 square feet of area per side or a total of 66 square feet. For this example, it is assumed that wheel 10 will rotate at 20 revolutions per minute and that the depth of the transfer media of wheel 10 is 10.6 inches. Using this information, the theoretical purge volume needed to purge wheel 10 used in this example can be calculated to be 1166 cfm (66 square feet*(10.6/12)*20 revolutions/minute).

Based on field and laboratory testing, it has been determined that the purge flow 14c is not completely uniform across the purge section 12. To compensate for this lack of uniformity, approximately 25% more purge air 14c has been provided in this embodiment to reach the 0.045% criteria (i.e., for the purge section 12 to be 99.955% efficient). Therefore, the 10' diameter wheel 10 in our example is given a purge angle 19 selected to provide a purge volume (e.g., of purge air 14c) of 1458 cfm (1166 cfm*1.25). Other embodiments may provide 10%, 20%, 30%, 50%, 75%, or up to 100% more purge air than the theoretical purge volume, as other examples.

It is also been determined from field and laboratory testing and calculation that the estimated air velocity through the purge section 12 at 2.5 inches of purge pressure is approximately 2066 ft/minute. Therefore to reach the desired purge volume of 1458 cfm at a purge velocity of 2066 ft/min, 0.706 square feet of purge area is required. Using this information, the purge angle 19 is calculated to be 3.9 degrees [(0.706 square feet/33 square feet per side)*180 degrees]. As a result, a purge angle 19 setting of 4 degrees (rounding up to the nearest degree) will be used in this embodiment to deliver a purge volume (e.g., of purge air 14c) of approximately 1496 cfm at the minimum airflow condition.

Figure 2B:
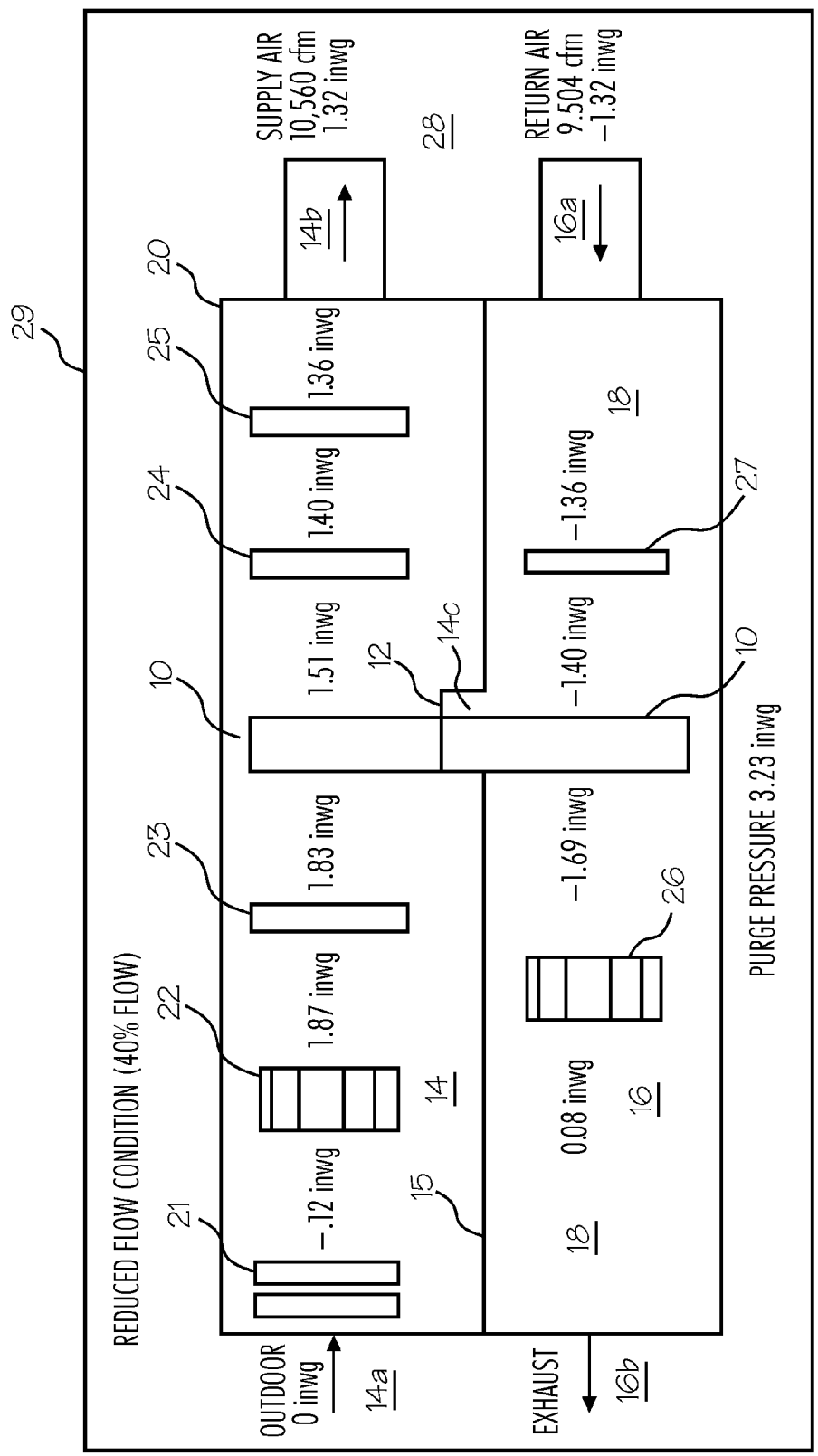
FIG. 2b is the block diagram of FIG. 2a illustrating the building and the ventilation system, and providing pressures, in inches of water, at various locations within the ventilation system at an intermediate flow condition of 40% of maximum flow.
Figure 2C:
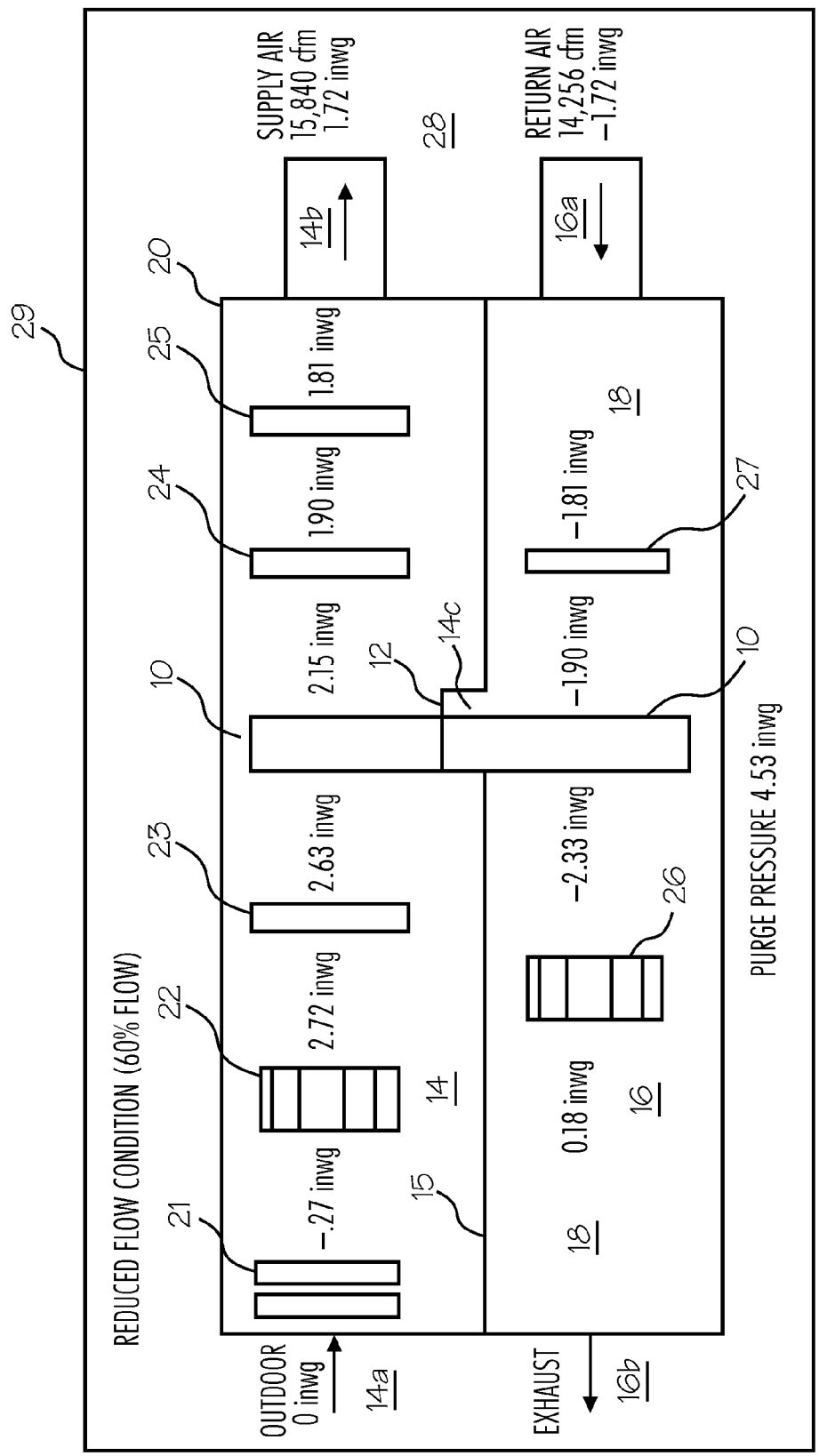
FIG. 2c is the block diagram of FIG. 2a illustrating the building and the ventilation system, and providing pressures, in inches of water, at various locations within the ventilation system at an intermediate flow condition of 60% of maximum flow.
Figure 2D:
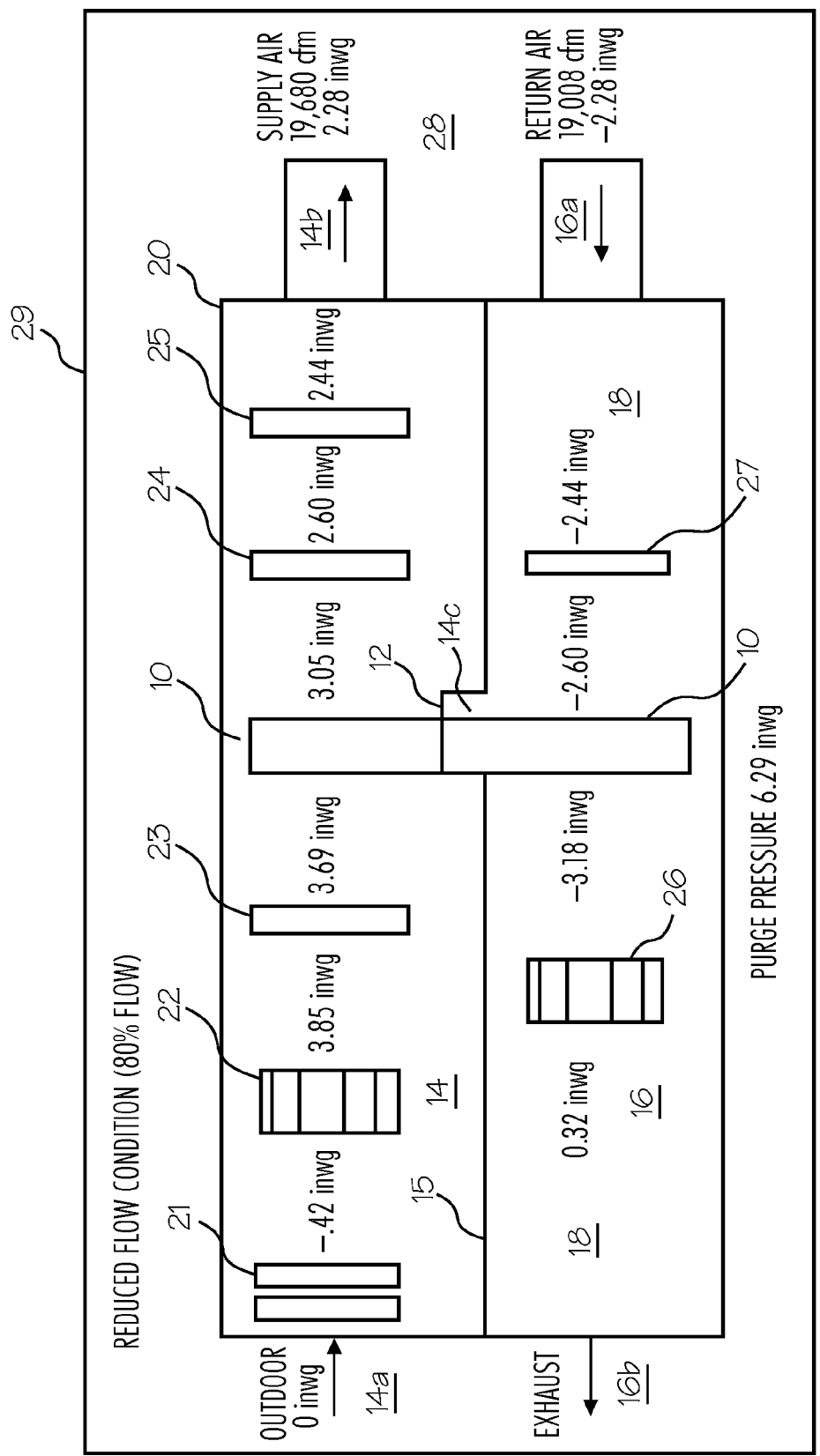
FIG. 2d is the block diagram of FIG. 2a illustrating the building and the ventilation system, and providing pressures, in inches of water, at various locations within the ventilation system at an intermediate flow condition of 80% of maximum flow.
Figure 2E:
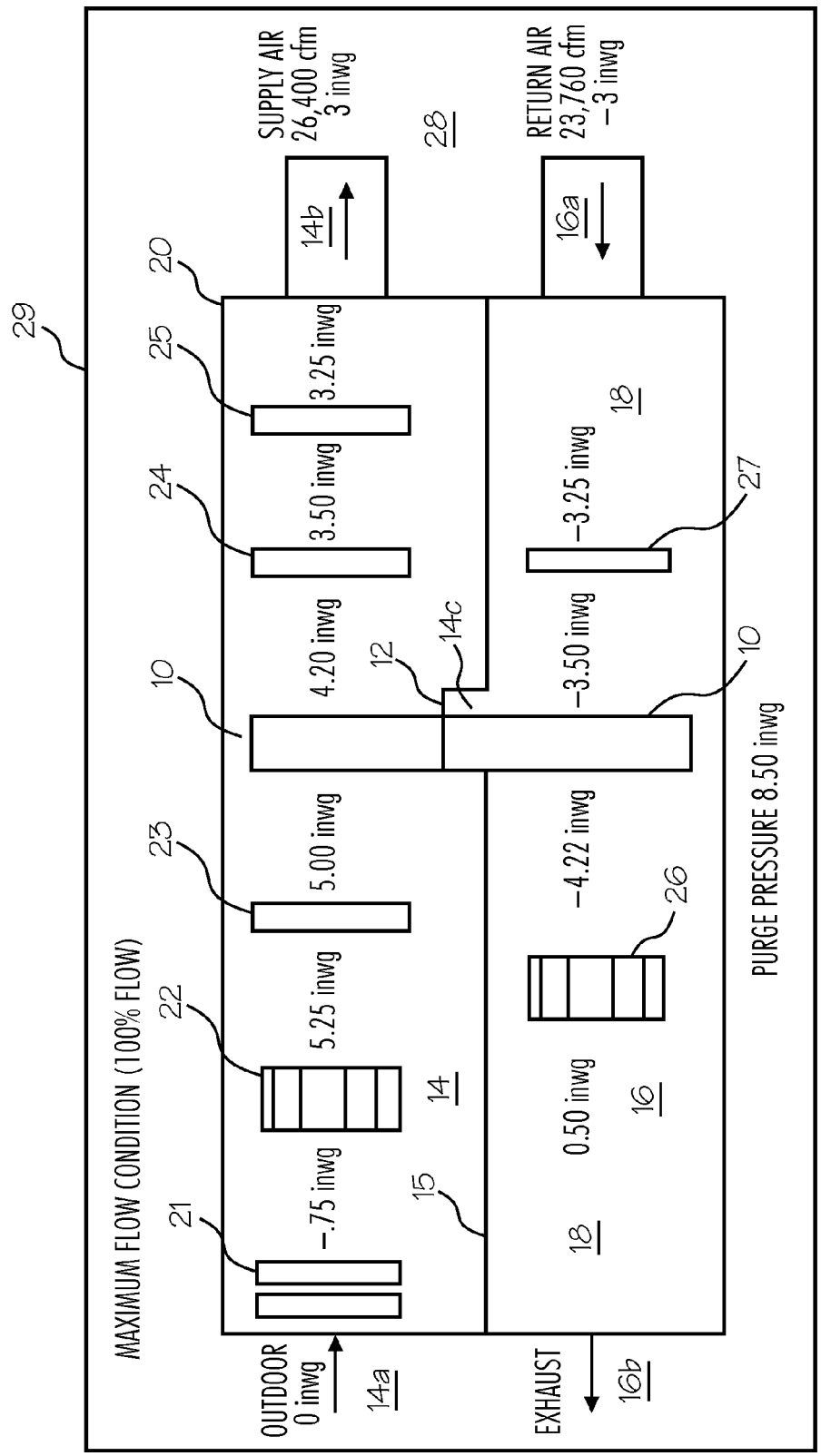
FIG. 2e is the block diagram of FIG. 2a illustrating the building and the ventilation system, and providing pressures, in inches of water, at various locations within the ventilation system at a maximum flow condition of 100% of maximum flow.

Looking now at the maximum airflow condition, in this example, it is also determined that the purge pressure differential at the 100% flow condition will be approximately 8.5 inwg. Static pressures used for this example at maximum flow are shown in FIG. 2e, and static pressures for this example at various intermediate flows (40%, 60%, and 80%) are shown in FIGS. 2b, 2c, and 2d respectively. Each of FIGS. 2a to 2e show the components and arrangement thereof in this example of a ventilation system 20 that are also shown in FIG. 2a and were described above with reference thereto. Referring to the maximum flow condition shown in FIG. 2e for this example, it should be noted that in some situations, some actual pressures may be even higher due to pressure additions within the airflow control valves to distribute and direct air to the appropriate zones within building 29. Since the purge angle 19 must be set at 4 degrees in this example to satisfy effective purge operation at the minimum flow condition, the purge volume (e.g., of purge air 14c) at the full flow condition will be much higher than the 1458 cfm that is needed since the increased purge pressure corresponds to an increase in purge airflow velocity. This resulting purge volume at the maximum flow condition can be calculated once the purge velocity associated with the increased purge pressure is known.

Based on field and laboratory testing and supported by calculation, the approximate air velocity through the purge section 12 at the 8.5 inches of purge pressure is 7034 ft/minute. At this purge pressure, purge velocity, and 4 degree purge angle 19, the resultant purge volume (e.g., of purge air 14c) at this condition is calculated to be 5093 cfm [1458 cfm*(7,034 ft/min/2066 ft/min)]. Accommodating the significant increase in purge volume (e.g., of purge air 14c) at the maximum flow and pressure condition may be problematic, among other things, since this added purge air volume (e.g., of purge air 14c) has to be added to the capacity of the system fan(s) (e.g., fans 22 and 26).

Referring still to FIG. 2, in the case of this typical example, the 10' diameter recovery wheel 10 selected to process 26,400 cfm could be effectively purged with 1458 cfm (e.g., of purge air 14c) at the minimum flow condition and a 4 degree purge angle 19. However, when operated at the full flow condition, the resulting purge requirement consumes 5093 cfm of purge air (e.g., purge air 14c). This represents a 250% increase (3635 cfm) over the purge airflow quantity that could be used if the purge angle 19 could set to accommodate the maximum flow, high purge pressure condition rather than the minimum flow condition.

Processing this additional 3,635 cfm is undesirable in many situations for several reasons. First, projects like hospitals and research laboratories that utilize total energy wheels may be designed with the outside air fan 22 blowing through the recovery wheel 10 and the exhaust air fan 26 drawing through the recovery wheel 10 to ensure that the contaminated return/exhaust airstream 16 will not leak across the seals that separate the outside/supply airstream 14 from the return/exhaust airstream 16 even if either fan (22 or 26) fails. As a result, any excess purge air 14c volume is handled by both the outside air and exhaust air fans (22 and 26). This added purge airflow 14c increases the energy consumed by both fans. In this example, the outside air and exhaust air fans (22 and 26) must generate a total static pressure of 6 inwg and 4.7 inwg respectively. This increases the brake horsepower of the outside air fan 22, at full flow design, by approximately 4.6 horsepower and 3.6 horsepower for the exhaust air fan 26. This increase may impact the size of the fan motors installed, the size of the electrical service required and, on occasions, the size or class of the fan selected. Assuming that the system operates at full capacity 75% of the time, and that electricity costs $0.08/kwh, then the additional annual operating cost associated with the increased purge airflow 14c is estimated to be $3232 for the 26,400 cfm system used for this example.

Another potential problem caused by the need to size the system fans (e.g., 22 and 26) to accommodate this purge flow 14c is that it may be missed during the design process. What may occur is that the fans are sized at the maximum flow conditions (as is commonly done for constant volume, non-VAV systems) but at the reduced purge volume associated with a smaller purge angle 19 chosen to operate effectively at only the high flow (maximum purge pressure) condition. In such cases, the purge angle 19 may be correctly set (opened to a greater setting) during field commissioning to function effectively at the minimum purge pressure. This may result in the fans (e.g., 22 and 26) being significantly short on airflow when operated at the maximum flow condition. In the worst case scenario, the motors, electrical service, or both, may be undersized and it may be extremely difficult to operate ventilation system 20 as intended. One option may be to accept high amounts of contaminant 18 carry-over at low airflow conditions with the purge set at the reduced, high airflow setting. Another option may be to accept less system airflow through the ductwork at the maximum flow condition which may mean that the exhaust air requirements are not met, the space 28 comfort is compromised, or both. Other resolutions to this problem may involve replacing fan motors, upgrading electrical service, or both, which may be expensive solutions in many situations.

In many situations, an ideal solution for this purge problem associated with variable airflow systems that employ total energy recovery wheels would be one that would allow for effective purge operation to occur over a wide range of airflow conditions. This invention provides, among other things, such solutions, some of which include using a fixed purge angle 19 set at the minimum position required by the maximum flow or maximum available purge pressure condition so that the lowest possible purge airflow 14c volume would be used at some or all flow conditions. Certain embodiments Would accomplish this without a significant compromise in total energy recovery effectiveness and some embodiments provide for an alarm, for example, to the central building automation/control system if system conditions ever exist where effective purge operation could not be provided. Some embodiments provide, in a variable air-volume system, appropriate purge flow 14c through recovery wheel 10 as the airflow rate varies to maintain purge effectiveness and limit carry-over of contaminants from the return/exhaust airstream 16 to the outside/supply airstream 14 at lower airflow rates while avoiding the excessive purge flow problem described above at higher airflow rates.

Certain embodiments of the invention contemplate changing the purge angle 19 during system operation to obtain appropriate purge air 14c flow under different flow or pressure conditions, for example, with an actuator. However, since recovery wheels (e.g., 10) may rotate millions of times each year, the purge section 12 is subjected to vibration and high forces as a result of the airflow pressures, and since purge section 12 must be positioned within a fraction of an inch from the rotating wheel surface, it is an advantage, at least in some applications, if the solution does not involve moving the purge section 12 once set. A further advantage would be for the solution to be cost effective and easily retrofitted to existing projects that experience problems associated with high energy costs or airflow shortages as previously described.

Figure 3:
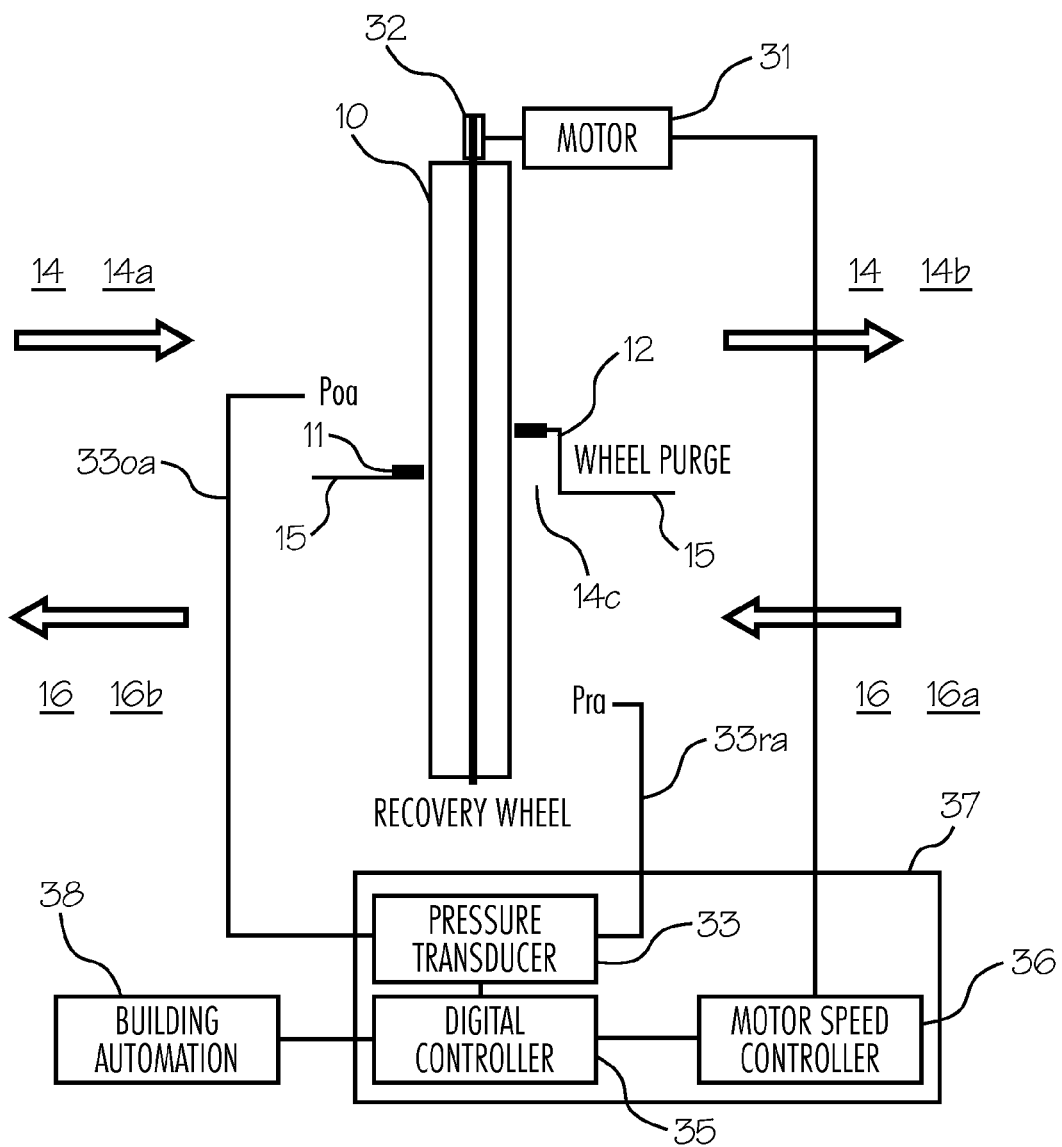
FIG. 3 is a block diagram illustrating a recovery wheel, a purge structure, one pressure transducer, and various controllers.

Referring now to FIG. 3, particular embodiments of the invention provide for the real time (or substantially real time) measurement of the recovery wheel purge pressure which may be fed to a digital controller 35 and used to compute and actively control the rotational speed of the recovery wheel 10, for example. Digital controller 35 may be a direct digital controller (DDC), a programmable logic controller (PLC), a programmable controller, or the like, and may include a processor, memory, software, or a combination thereof. Other embodiments may use an analog controller. Knowing the purge pressure, wheel 10 size and initial purge angle 19 setting, an algorithm or software within controller 35 may actively control wheel 10 rotational speed which may be selected or optimized to maintain the desired purge efficiency level while, in some embodiments, simultaneously maintaining an increasing level of total recovery effectiveness (temperature and humidity recovery, or at least one of these) as the airflow through the recovery wheel 10 varies from its maximum to its minimum operating range.

As illustrated in FIG. 3, the components employed by an example of an embodiment of this invention include a pressure transducer 33 to measure the pressure differential between the two airstreams (e.g., outside/supply airstream 14 and return/exhaust airstream 16) driving the purge airflow 14c. Other embodiments would measure the absolute or gauge pressure at each location, and may use two pressure transducers. In the case of the example shown by FIG. 3, the differential pressure measured by pressure transducer 33 is the difference in static pressure, just before the recovery wheel 10 media, in the outside air 14a and return air 16a. In this embodiment, pressure transducer 33 essentially measures the static purge pressure. Other locations may be used in other embodiments, such as supply air 14b, exhaust air 16b, or both. The pressure transducer 33, in some embodiments, converts the pressure reading to an electrical signal (e.g., a 4-20 ma or 0-10 volt signal), for example, that may be received by digital controller 35. In other embodiments, transducer 33 produces a digital output, as another example.

In various embodiments, controller 35 may use the measured real time purge pressure value (e.g., the difference between the pressures within tubes 33*oa* and 33*ra*) along with other information in some embodiments, such as the wheel 10 transfer media volume and the purge angle setting 19 (e.g., shown in FIG. 1*b*) in an algorithm to calculate the wheel 10 speed needed to maintain the desired purge efficiency (for example, greater than 99.955%). This may be accomplished by calculating the rotational speed (i.e., of wheel 10) necessary to ensure that the necessary or desirable purge air 14*c* volume passes through the recovery media (i.e., of wheel 10), as it rotates from the contaminated return/exhaust airstream 16 into the outside/supply airstream 14, before the wheel 10 media moves through the purge, section 12 and into the outside/supply airstream 14, for example.

In this embodiment, electrical motor 31 drives wheel 10 with a pulley and belt 32. The speed of motor 31 is controlled by speed controller 36 in this embodiment. Motor 31 may be an AC motor, in some embodiments, and motor speed controller 36 may be a variable-frequency drive, for example. Speed controller 36 may control the speed of motor 31 (and thus wheel 10) based on an input from digital controller 35, for example. In some embodiments, digital controller 35 may also interface with building automation 38. For example, controller 35 may send an alarm signal to building automation 38 if and when controller 35 determines, based on input from pressure transducer 33, for example, that pressure conditions are such that it is not possible to assure adequate purge flow 14*c*.

In short, in this embodiment, when the airflows through the supply and exhaust systems are high, the corresponding purge pressure differential between the two airstreams (e.g., 14 and 16) driving the purge 14*c* is also high. As the system airflow is modulated lower, the purge pressures will be reduced in the variable volume HVAC system of this example, thereby causing the problem previously described of insufficient purge flow 14*c*. As the purge pressure differential is decreased, so is the purge airflow 14*c* volume. Since a given size recovery wheel 10 requires a certain purge volume 14*c* for effective operation, independent of the airflow (e.g., 14,16, or both) that is processed through it, as the purge airflow 14*c* drops, so does the purge efficiency. And, not only does purge efficiency drop, but it drops very rapidly as is shown by FIG. 4, which shows how the contaminant 18 (shown in FIG. 1) carry-over increases with decreased system airflow (e.g., 14, 16, or both) if the purge angle 19 is fixed based on the maximum airflow/purge pressure condition.

Figure 4:
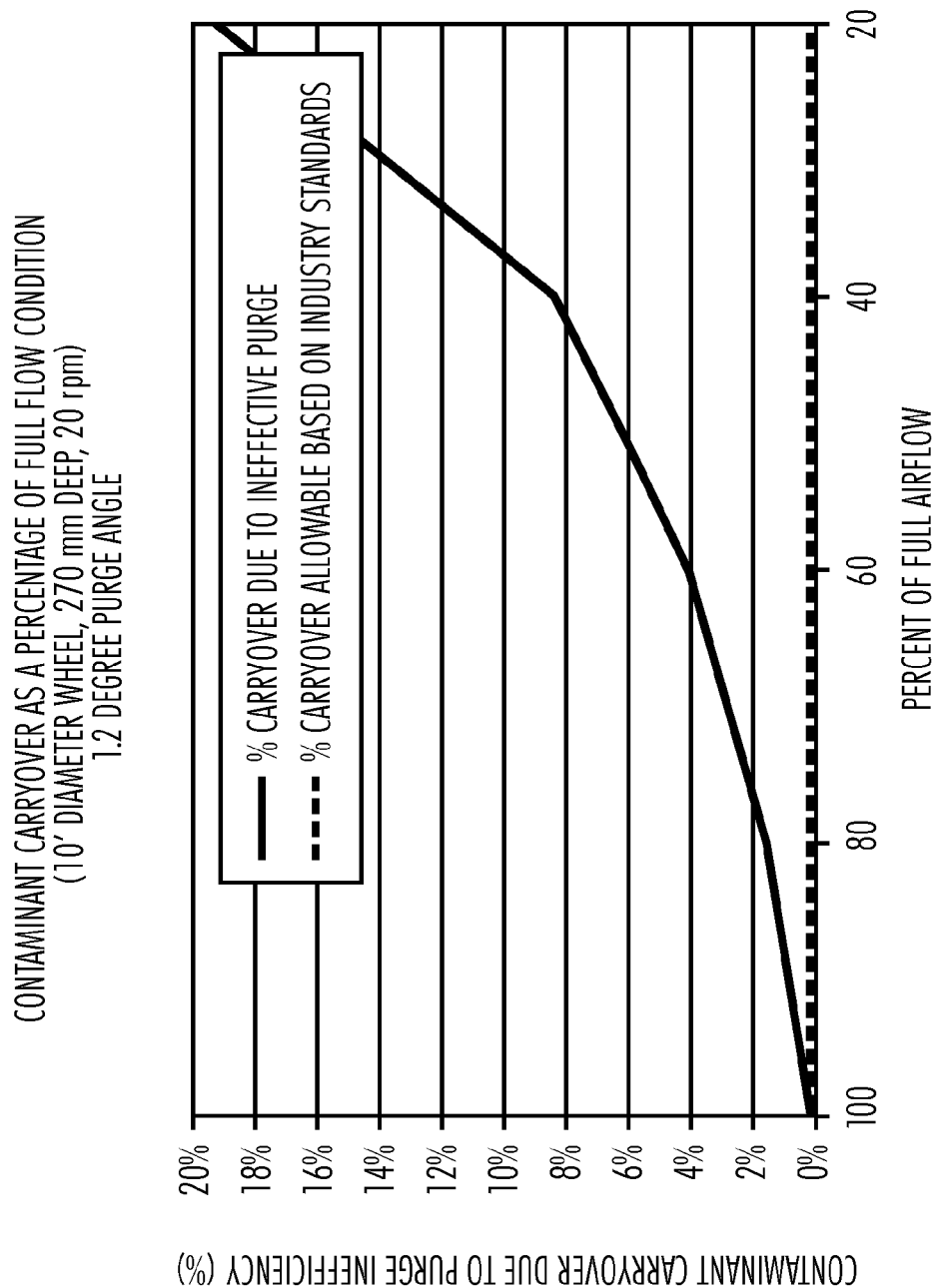
FIG. 4 is a graph showing contaminant carry-over within a recovery wheel as a percentage of full flow condition for a ventilation system that does not vary wheel speed or another wheel parameter as system airflow changes, and also showing an industry standard for allowable contaminant carry-over.

FIG. 4 reflects an analysis of a system that utilizes a 10' diameter recovery wheel 10 selected to condition 26,400 cfm of supply air 14*b* and a like quantity of return air 16*a* at maximum flow conditions. The variable volume system modeled is modulated from its maximum flow condition down to only 20% of its maximum. As the airflow is reduced, the pressures through most of the system drops by the square root of the change in flow. This reduces the purge volume 14*c* for a given size wheel 10, thereby decreasing purge efficiency. System diagrams are shown in FIG. 2*a* and FIG. 2*b* (as well as later figures) that map out the flows and pressures at various flow increments to show the reduction in system and purge pressures in a particular embodiment. FIG. 4 highlights a serious issue addressed by many embodiments of the invention. The significant drop in the purge airflow 14*c* volume combined with a simultaneous drop in supply airflow 14*b* causes the percentage of carry-over to increase from the desired 0.045% (represented by the dark horizontal line in FIG. 4 just above 0%), in this example, up to as high as 19%, an increase by a factor of 422 over the desired industry limit. In most applications, this degree of carry-over would not allow the recovery wheel to be operated. Accordingly, in some embodiments, recovery wheel 10 is not operated or is not rotated when a pressure, differential pressure, flow rates, fan speed, or the like, drops below a certain minimum threshold.

Figure 5:
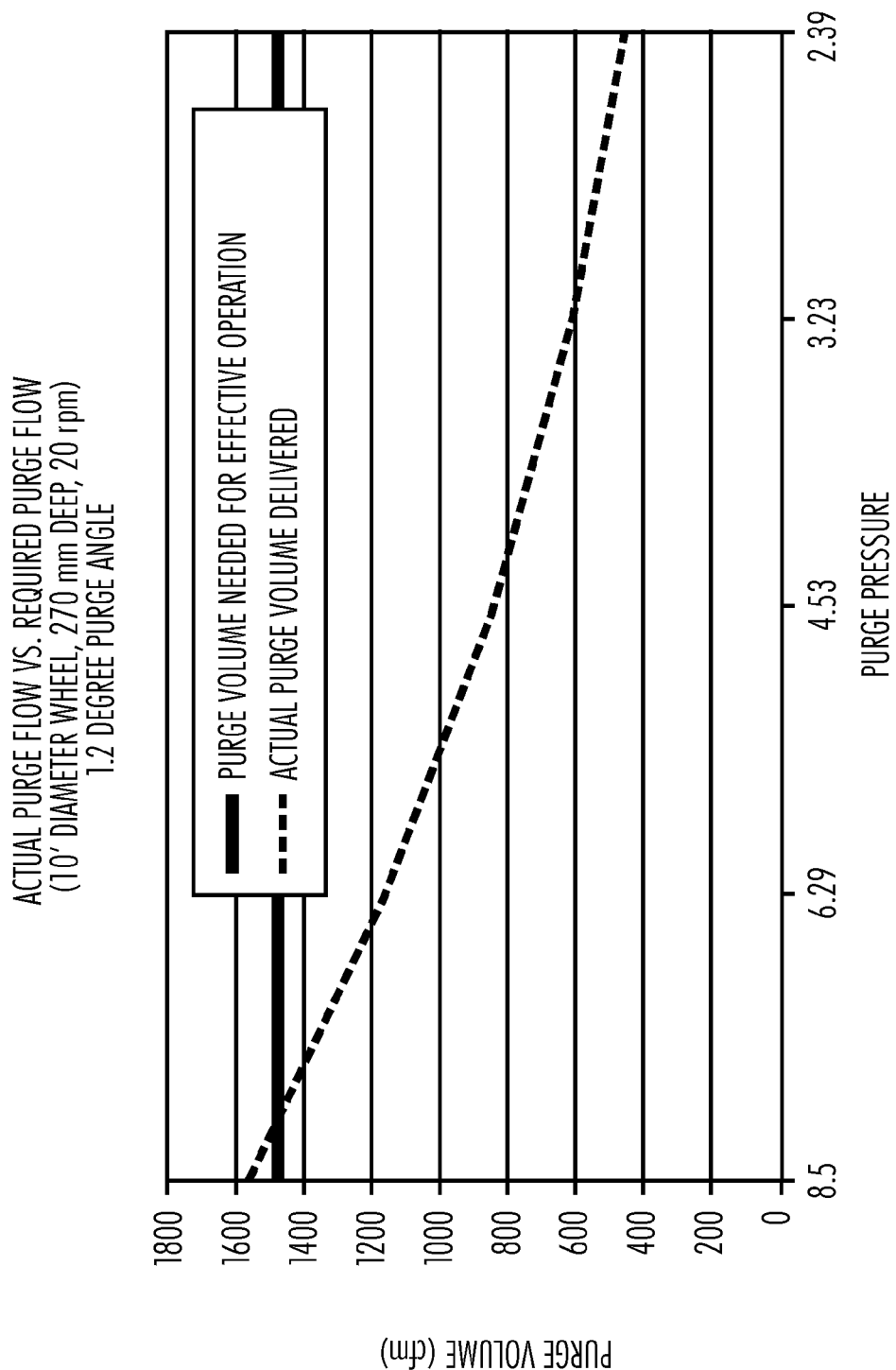
FIG. 5 is a graph showing actual purge flow compared to required effective purge flow for a ventilation system that does not vary wheel speed or another parameter of the wheel as system airflow changes.
Figure 6:
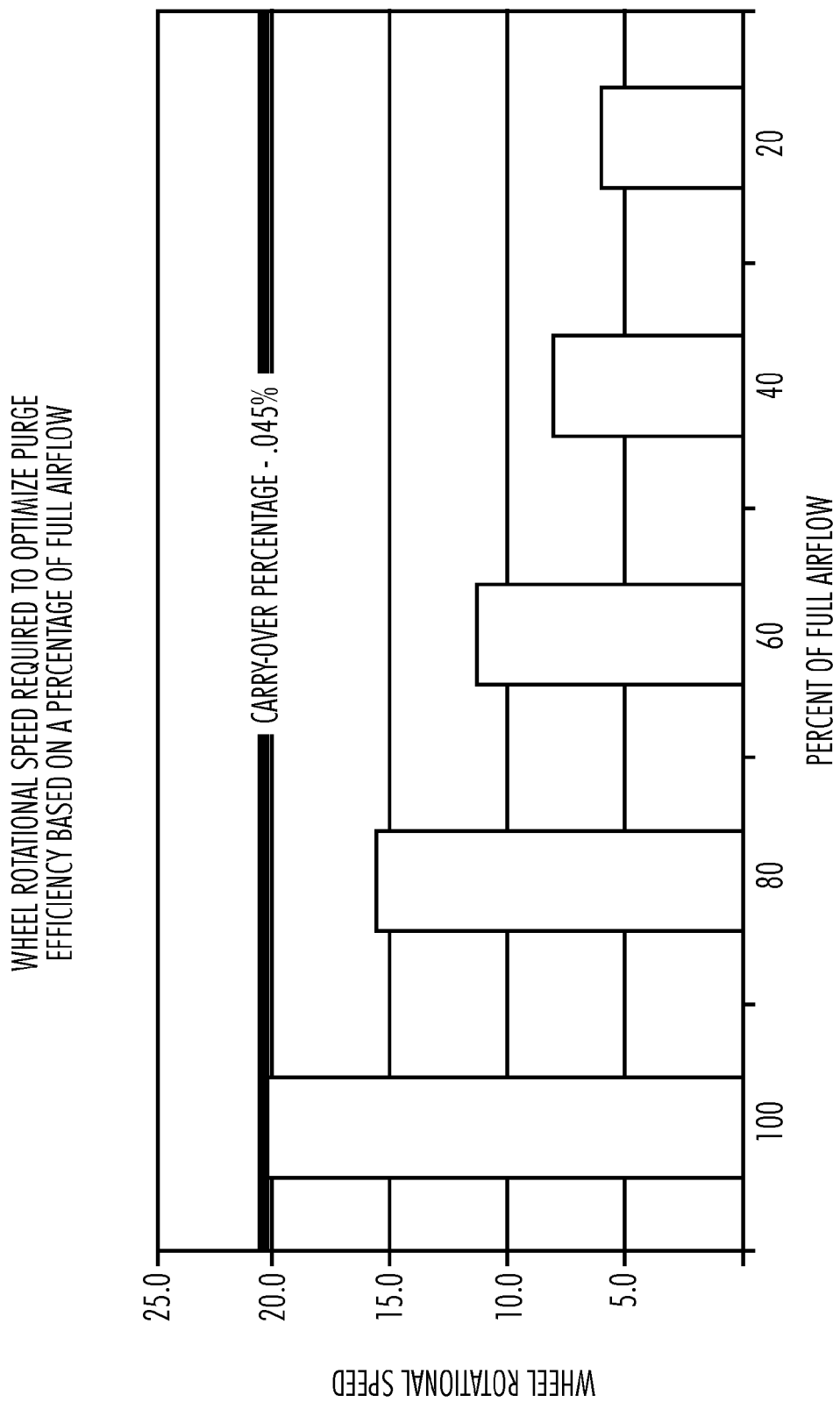
FIG. 6 is a bar chart showing wheel speed required to optimize purge efficiency as system airflow changes.

FIG. 5 shows a corresponding drop in purge volume (i.e., of purge flow 14*c*) as the system pressures and purge pressures are reduced. The target purge volume (i.e., of purge flow 14*c*) of 1458 cfm for the 10' wheel 10 used in our previous example to meet the desired purge efficiency at full flow would be achieved with a purge angle 19 setting of approximately 1.2 degrees. However, using this same purge angle, the resulting purge airflow volume is reduced to only 455 cfm at a minimum flow condition. Since the wheel 10 needs 1458 cfm for effective purging, yet only 455 cfm is delivered, the result is a drop in purge efficiency, shown by FIG. 4. However, when the invention described by FIG. 3 is employed, the wheel 10 speed is strategically decreased as the purge pressure and purge flow 14*c* is decreased such that the purge efficiency is optimized or maintained and remains substantially constant in this embodiment independent of the system airflow percentage. This is shown in FIG. 6, which illustrates data showing a constant purge efficiency despite the modulation of system airflow. In this example, the level of carry-over or purge efficiency remains at the industry specified 0.045% as the wheel 10 speed is varied from a high of 20 rpm to a low of approximately 6 rpm to correspond to a reduction from 100% to 20% of full flow conditions.

Figure 7:
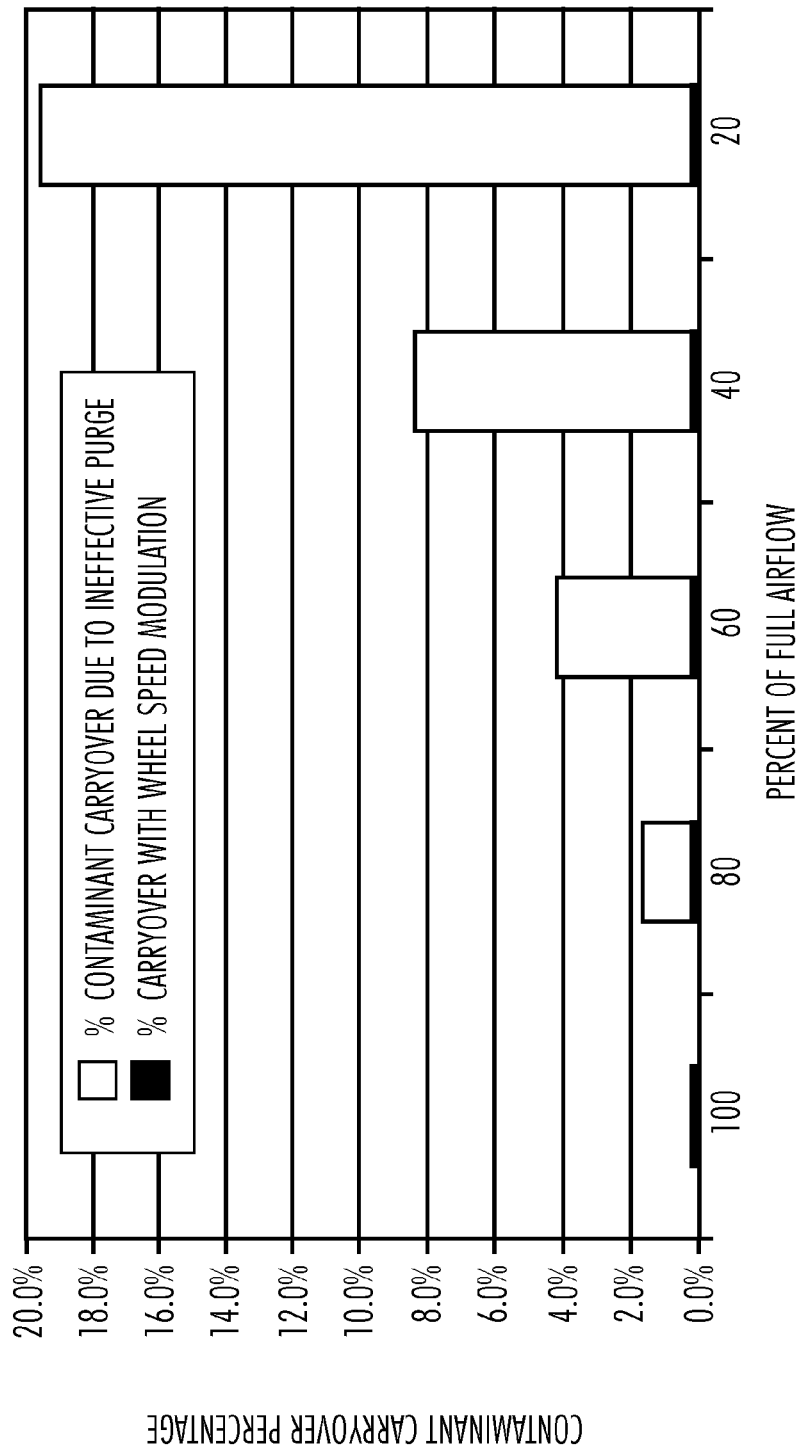
FIG. 7 is a bar chart showing contaminant carry-over as a percentage of full flow condition for a ventilation system that does not vary wheel speed or another parameter of the wheel as system airflow changes, in comparison to a system that varies wheel speed as system airflow changes.

FIG. 7 presents the same data in a different format, showing the difference in purge efficiency as a function of flow modulation for both the previously described fixed purge method, with the purge angle 19 set for the maximum flow condition, and for the modulated wheel speed embodiment just described. The presentation of the data in FIG. 7 illustrates the purge efficiency of each embodiment directly, highlighting the benefits of the embodiments where the wheel 10 speed is varied as a function of pressure, pressure differential, flow, or fan speed, as examples.

The advantages associated with the variable wheel 10 speed embodiments are significant in many situations. However, since the reduction of the wheel 10 speed may also be used to reduce the efficiency of wheel 10 to avoid overheating space 28, for example, there may be a logical concern that this variable-speed purge-optimization system or method might result in a large reduction in recovery performance. In at least some applications, a desired recovery relationship for a system with varying airflow capacity is where the recovery performance remains constant or increases slightly with a reduction in airflow. It may be desirable that the recovery performance not diminish with decreased airflow since the end user may want to save as much energy as can be realistically recognized. Further, if the recovery efficiency dropped off too significantly, system performance problems might be observed. For example, if reducing the airflow to 80 percent of the maximum flow volume required a wheel speed that reduced the recovery performance by 50%, in some cases, there might not be enough cooling or heating capacity to maintain delivery of the desired conditions, or the savings in fan power by reducing the airflow might not justify (or would be at-least partially offset by) the loss of recovery. On the other hand, if the recovery performance increases too significantly (approaches 100% for example), in some cases it may actually create certain control problems for devices like cooling coils, heating coils or humidifies since the modulation range may not accommodate the small amount of additional load required.

Laboratory testing was completed to determine if it would be possible and beneficial in some instances to integrate wheel speed modulation to maintain optimum purge efficiency using a minimum fixed purge angle 19 while simultaneously maintaining the desired level of recovery performance over the range of airflow modulation for both sensible and total recovery type energy wheels 10. A total energy recovery wheel 10 representative of that used for the example discussed earlier was tested in accordance with ASHRAE standard 84 at design cooling season conditions and over a range of airflows representing 100% to 20% of maximum flow. At each airflow condition, sensible, latent and total energy (enthalpy) recovery performance was determined at various wheel 10 rotational speeds, as shown in FIG. 6, to bracket that needed to maintain optimum purge performance.

The maximum wheel speed of energy recovery wheel 10, for example, may be chosen to have sufficient mass and speed of recovery wheel 10 relative to the mass of the airflow processed (e.g., of outside/supply airstream 14, return/exhaust airstream 16, or both) while limiting the amount of carry-over and thereby purge airflow 14c required. Once the speed, surface area, and mass of wheel 10 are sufficiently large in comparison to the mass flow rate of the air, little or no additional recovery is obtained by additional speed of wheel 10. Based on these principles, the maximum wheel 10 speed may be selected at the maximum airflow. In the case of the wheel 10 tested, for example, the maximum wheel speed was selected to be 20 revolutions per minute.

Since at the 20 rpm selected, this wheel 10 has just sufficient mass and surface area to approach its optimum sensible and total performance, if this speed is reduced and the airflow through recovery wheel 10 remains at its maximum level, the ratio of the mass and area of wheel 10 relative to the mass of the air processed becomes lower and therefore the sensible and total enthalpy recovery performance is reduced. In fact, this reduction in performance as a function of reduced wheel speed may be used to deliver a desired supply air 14b temperature from wheel 10, in some embodiments, if less than maximum recovery is needed or desired. In certain embodiments, a temperature sensor located after wheel 10, in supply air 14b, (e.g., sensor 102 shown in FIG. 10) may send a signal to reduce wheel 10 speed to the degree necessary to deliver the desired temperature of supply air 14b, for example. In some embodiments, a second sensor may be installed in exhaust air 16b leaving wheel 10 (e.g., sensor 104 shown in FIG. 10), which may be used during very cold days to reduce wheel 10 recovery efficiency during extreme days to avoid condensation and frost formation.

In various embodiments, the reduction in wheel 10 speed is a function of or directly related to the drop in purge pressure which is also directly linked to the change in flow volume. Further, the wheel 10 speed needed to approach the optimum performance can be reduced as the flow is decreased without loss of recovery performance since a lower airflow increases the ratio of wheel 10 mass and area to the mass flow rate of the air. The relationship between the airflow used, corresponding purge pressure, purge airflow 14c and desired wheel 10 speed for optimum purge are all interrelated in many applications. As a result, when a lower wheel 10 speed is required to obtain the desired purge efficiency at reduced airflow with a fixed purge angle 19, the speed of the wheel 10 may remain sufficiently high that near optimum performance may still be recognized.

Figure 8:
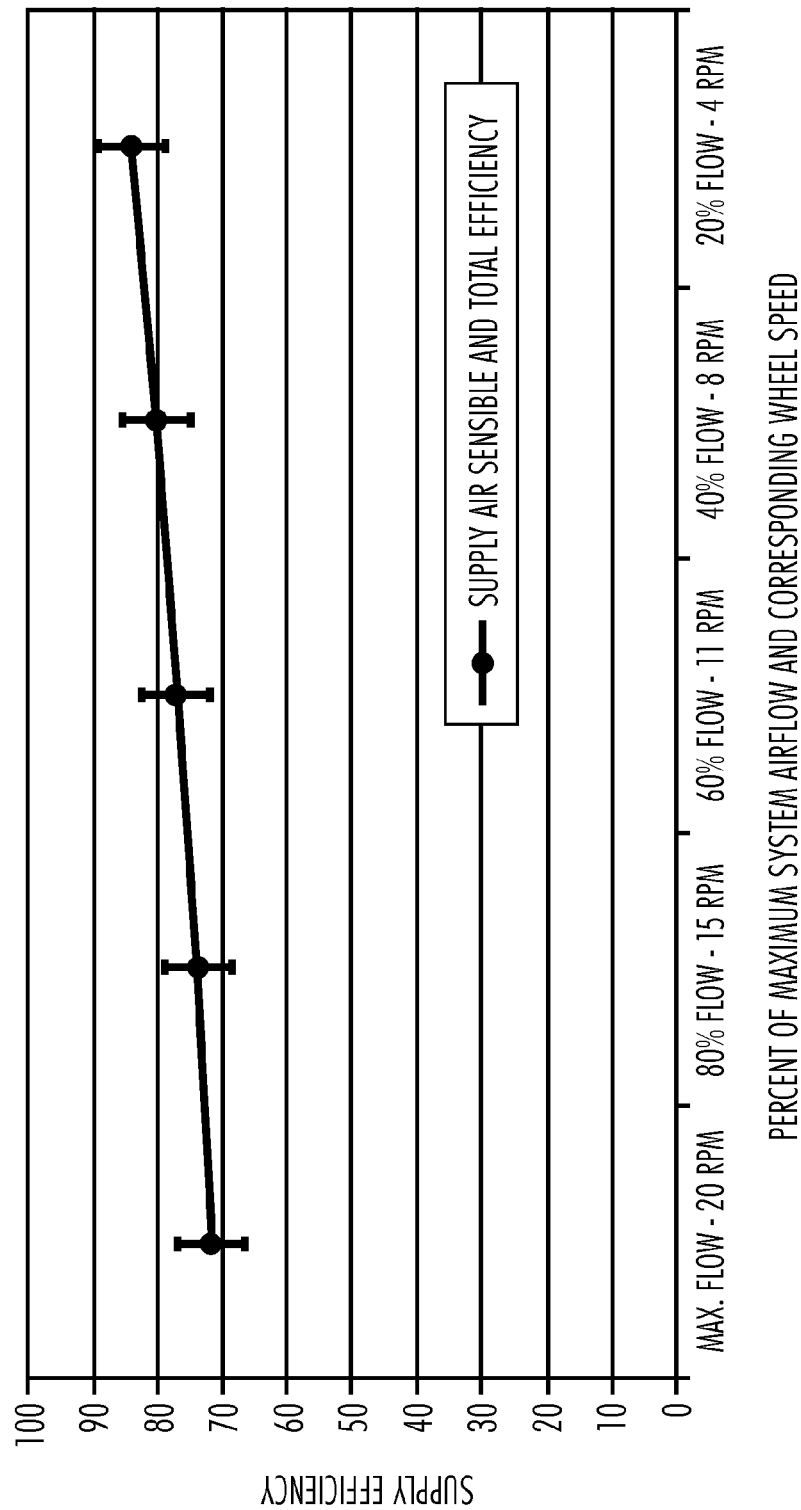
FIG. 8 is a graph showing an example of typical recovery performance as system airflow volume and wheel speed change in a ventilation system that varies wheel speed as system airflow changes.

The results of certain recovery wheel testing are shown in FIG. 8, which shows how an optimum purge efficiency can be provided while maintaining a desired recovery efficiency behavior. In this example, the recovery efficiency gradually increases with decreasing flow. The testing concluded that desired recovery performance could be obtained despite the reduction in wheel 10 speed implemented to optimize purge operation. As shown, both sensible and total recovery performance continued to increase over the entire range of airflow modulation despite the significant reduction in wheel speed. This establishes that in this example, as the wheel speed is reduced to maintain optimum purge performance, the corresponding reduction in airflow maintains a ratio of wheel 10 mass/area to airflow that is high enough that no significant reduction in recovery performance is experienced in comparison with recovery performance at higher flows.

This means that the variable wheel speed embodiment of purge optimization for variable volume systems can function without a reduction in recovery performance. This represents a favorable solution to a serious problem associated with use of recovery wheels 10 in variable air-volume systems. This embodiment addresses a significant need as more and more laboratories, for example, are being designed to be variable air-volume systems. Likewise a growing number of existing laboratories that were originally designed to incorporate recovery wheels and operate as constant volume systems may be modified or converted to variable air-volume systems in accordance with this invention, for instance, to reduce energy consumption further. These systems needed a solution to the wheel purge problem that can be easily retrofitted as well, and since the fans and fan motors are existing there would be a significant cost associated with replacing them to increase the purge airflow volume as may be needed if the purge angle 19 was increased to facilitate effective purge operation at a lower system airflow.

Figure 9:
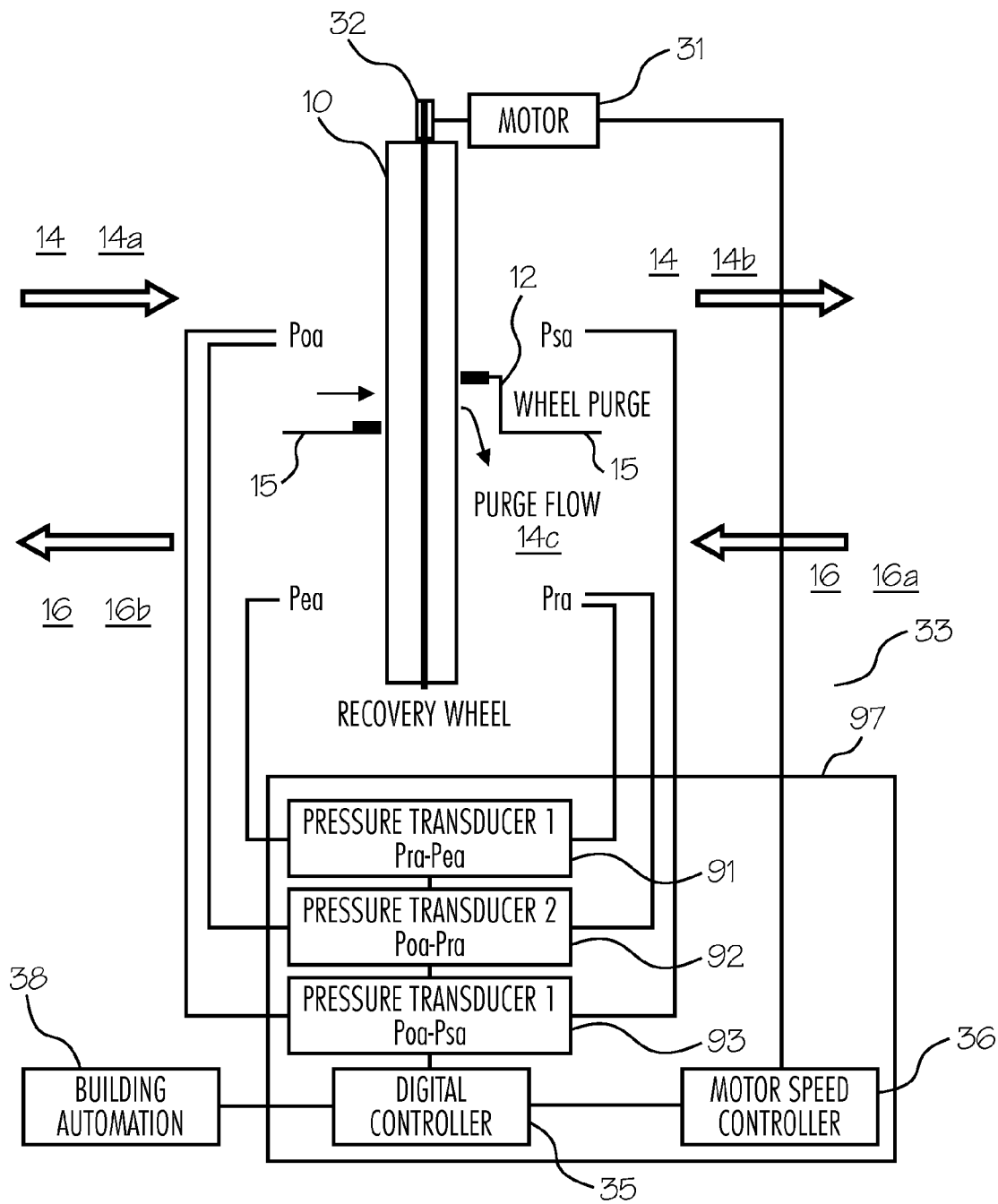
FIG. 9 is the block diagram of FIG. 3 illustrating the recovery wheel, purge structure, and various controllers, but having three pressure transducers.

Other significant enhancements and advantages provided in some embodiments of the invention include the ability to measure and report the outside/supply airflow 14, the return/exhaust airflow 16, or both, providing a low pressure alarm to ensure proper seal operation, or a combination thereof. FIG. 9 shows how several pressure transducers may be integrated into the embodiments shown in FIG. 3. FIG. 9 illustrates an expanded embodiment of the variable wheel-speed purge controller and alarm described above that includes added transducers to measure airflow across each side of recovery wheel 10 and to provide an alarm if the pressure driving the purge flow volume drops below the supply side pressure loss, for example.

As shown in FIG. 9, pressure transducers 91, 92, and 93, to measure the pressure loss across the recovery wheel 10 media, are integrated into a system previously described in some embodiments. By enhancing the programming of digital controller 35, these pressures can be used, for example, along with the recovery wheel 10 face area (e.g., manually inputted) and an algorithm correlating the air pressure loss measured with airflow face velocity to provide an accurate estimate of either the outside/supply 14 or return/exhaust 16 airflow. This is possible since a honeycomb structure used to form the energy wheel 10 media is sufficiently uniform, in some embodiments, and causes even distribution of airflow across the entire face of recovery wheel 10. Since the hydraulic diameter of the tubes within the honeycomb style media in this example maintain laminar flow behavior over the airflow range typically used, the relationship between air pressure loss and face velocity may be nearly linear in many embodiments. This is explained in more detail for particular embodiments by SEMCO U.S. Pat. No. 6,016,710, which is incorporated by reference herein.

Knowing the airflow through recovery wheel 10 at any point in time may be beneficial for several reasons in some embodiments. First, when variable airflow systems are utilized, in some embodiments, system airflows may be measured to ensure proper pressurization and/or "tracking" of the outside air fan 22 with the exhaust air fan 26 (see e.g., FIG. 2). Secondly, since in many embodiments the airflow at any point in time is a variable driven by the building 29 loads, for instance, knowing the airflow is helpful in certain embodiments if there is a desire to measure the energy savings associated with energy recovery wheel 10 (discussed in more detail later), for example. Finally, this airflow data can be used as a secondary point of control in some embodiments to ensure that the wheel speed is not higher than is needed to reach a desired recovery efficiency.

In particular embodiments, this provides a contingency against an inadvertent change to the systems pressure profile (e.g., duct leak, fan failure, duct modification, blockage, etc.) to ensure that even if the purge airflow is increased, the wheel speed would be limited to that needed for desired or optimum performance. In this way, the highest or desired purge efficiency is maintained in these embodiments. Likewise, should the pressure transducer 92 used to measure the purge pressure differential become defective, the airflow measuring transducer (e.g., 91 or 93) can be used to limit the wheel 10 speed as the flow changes, which ensures proper purge operation in such situations, in some embodiments. In short, digital controller's (35) programming may look at both the purge pressure (e.g., from transducer 92) and system airflow (e.g., from transducer 91, 93, or both), in some embodiments, to ensure that both are satisfied when determining the optimum wheel speed required for optimum purge efficiency.

A second beneficial use of the pressure loss measurement across the supply air side of the recovery wheel (e.g., from transducer 93), in some embodiments, is to allow a comparison between it and the purge driving force (e.g., from transducer 92). In certain embodiments, an alarm is sounded if at any time during normal operation the purge driving force differential (e.g., from transducer 92) was measured to be less than the pressure loss across the outside/supply airstream 14 side of the recovery wheel (e.g., from transducer 93). Under such conditions, the absolute pressure in the return air 16a would have to be greater than the absolute pressure in the supply air 14b. This should not be allowed to occur in some embodiments, for example, in critical applications such as laboratories, smoking areas, toilet exhaust, etc., because the contaminated, return air 16a would be pushed across the wheel 10 seals into the clean supply air 14a. This may be an important alarm point of interest to health and safety officers responsible for laboratory facilities, for example, where recovery wheels are installed. As shown in FIG. 9, monitoring these two pressure loss conditions (shown as transducers 92 and 93) may be accomplished in conjunction with certain purge optimization embodiments described herein. Should an alternate location of the purge section 12 be used in some embodiments, then the flow across the return/exhaust airstream 16 side of the wheel 10 (e.g., measured by transducer 91) may be used, for example, in lieu of the outside/supply airflow 14 (e.g., measured by transducer 93).

Figure 10:
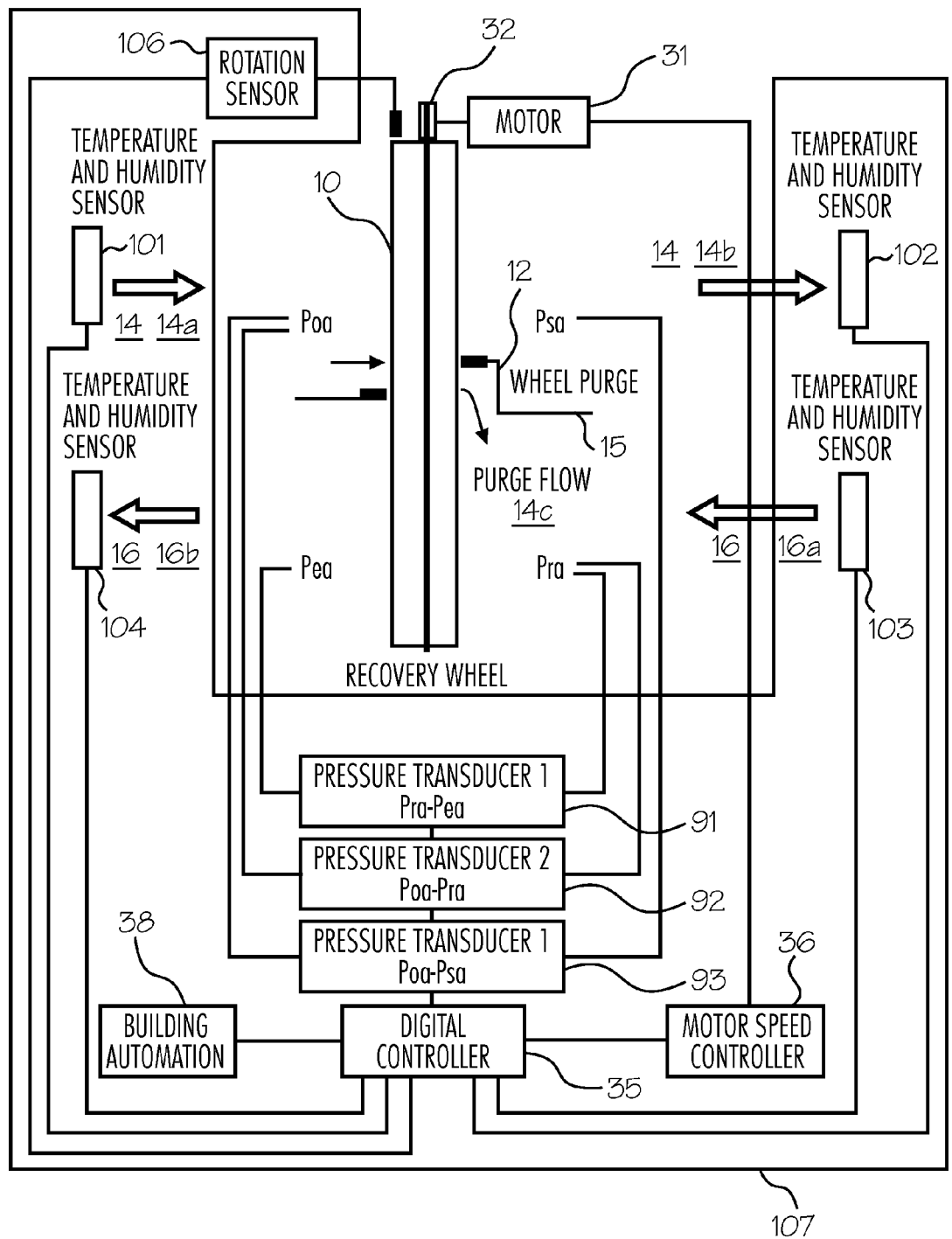
FIG. 10 is the block diagram of FIG. 9, but illustrating an embodiment having temperature and humidity sensors and a rotation sensor.

FIG. 10 shows how wheel speed modulation using temperature or enthalpy set points, for example, may be integrated with some embodiments of the purge optimization controller addressed by this invention. Certain embodiments include temperature or humidity sensors, or both (enthalpy control) (e.g., sensors 101, 102, 103, and 104), which may be used to perform control functions, to calculate energy recovery efficiency, or both, as examples.

In some embodiments, the speed of wheel 10 is determined or measured by a speed output of digital controller 35, or by a frequency output signal of motor speed controller 36, as examples. But in some embodiments, a rotation sensor 106 is used to measure the rotational speed of wheel 10, as illustrated in FIG. 10. Output from rotation sensor 106 may feed into digital controller 35 in some embodiments, as shown. In some embodiments, rotation sensor 106 may be used to detect a problem, for example, if belt 32, motor 31, or motor speed controller 36 were to fail and wheel 10 were to stop rotating. In some embodiments, rotation sensor 106 may be used in conjunction with a DC motor 31, as another example. In some embodiments, digital controller 35 may utilize a signal from rotation sensor 106 to modulate a signal to motor speed controller 36 in order to control the speed of motor 31 and thus wheel 10, for example, using a feedback control routine.

The temperature and relative humidity sensors 101, 102, 103, and 104 shown in FIG. 10 may be used in conjunction with energy recovery wheels 10 to accomplish several control functions in various embodiments of the invention. Although shown as temperature and humidity sensors, in different embodiments, sensors 101 to 104 may measure temperature, humidity, relative humidity, or a combination thereof, as examples. One set of embodiments involves using a supply air 14a sensor 101 to measure temperature to limit the temperature of supply air 14b leaving recovery wheel 10 to avoid over-heating the space (e.g., 28). A number of embodiments includes using a differential between the outside air 14a and return air 16a sensors (101 and 103) to determine if the building (e.g., 29) is in heating or cooling mode. Yet another embodiment of a control function uses a temperature sensor 104 located in the exhaust air 16b to avoid condensation or frosting of recovery wheel 10 by modulating the wheel speed to avoid cooling the exhaust air 16b below its dew point temperature. A more-sophisticated approach uses relative humidity sensors to calculate enthalpy values so that enthalpy differential, for example, can be used to determine the cooling mode rather than temperature only. Numerous other control modes exist for the use of these sensors 101 to 104, which may be apparent to a person of skill in the art.

In some embodiments, the purge efficiency optimization via pressure monitoring and active wheel speed modulation aspects of this invention can be seamlessly integrated with other stated control functions. Since the digital controller 35 calculates the maximum allowable wheel speed, at any purge pressure condition needed or desirable to ensure effective purge operation, this maximum speed, therefore, becomes the starting point from which the other control modulations begin in some embodiments. For example, in certain embodiments, to avoid over cooling the space (e.g., 28), the supply air 14b temperature sensor 102 reduces the wheel 10 speed below that needed for effective purge operation. In this manner the overcooling issue is addressed and the purge efficiency increases since a slower wheel speed results in more purge air 14c being moved through wheel 10 for a given rotation. Stated differently, the purge efficiency optimization via pressure monitoring and active wheel speed modulation embodiment resets the maximum allowable speed or Hz delivered by speed controller 36 while allowing other control functions to operate. Since as previously stated, the desired recovery performance is maintained at the reduced airflow conditions despite the reduction in wheel speed, the control methods mentioned previously function as desired in various embodiments.

A number of the purge efficiency optimization via pressure monitoring and active wheel speed modulation embodiments use a digital control system to track or monitor the signals received from input devices such as pressure transducers (e.g., 91, 92, 93, or a combination thereof) to compute a desired wheel speed, and some embodiments may also be configured to compute and accumulate energy savings data associated with energy wheel 10. Transducers (e.g., 91, 92, 93, or a combination thereof) placed across the outside/supply airstream 14 and return/exhaust airstream 16 sides of wheel 10, for instance, enable the measurement of airflow in many embodiments. Likewise the temperature and relative humidity sensors 101 to 104 allow for the measurement or calculation of the energy content (e.g., enthalpy) in one or both airstreams (e.g., 14 and 16) in some embodiments. The energy saved at any point in time may be determined in some embodiments by noting the enthalpy change between the outside 14a and supply 14b air, and multiplying this difference by the mass airflow (e.g., of 14b) and appropriate constants, for example.

Calculating these savings each hour and accumulating these values will provide a record of energy saved, in some embodiments, which may be of interest to users of the technology in certain applications. In addition to (or instead of )the total energy saved over time (e.g., BTUs) the digital controller 35 can also report the net recovery efficiency for one or more airstreams (e.g., 14, 16, or both), in certain embodiments, for example, by dividing the enthalpy change across the outside/supply 14 or return/exhaust 16 airstreams or sides of recovery wheel 10 by the difference in enthalpy between the outside air 14a and return air 16a.

Further, some embodiments of the invention have the ability to automatically select an optimum or desirable purge angle 19 for the owner or field service technician. Knowing the model number (e.g., size of the recovery wheel 10) a measured purge pressure is used, in some embodiments, to estimate the airflow 14c velocity that will exist through the purge section 12. Dividing the required purge airflow 14c volume for a given wheel 10 size by the resultant purge velocity at the high flow condition (maximum purge driving force) gives the necessary purge area that can be matched with algorithms placed in digital controller 35, for example, to choose the optimum or a desirable purge angle 19 setting in some embodiments. This optimum setting can be shown on a digital display, in some embodiments, or read on a computer screen monitoring controller 35. This value is then used in some embodiments to set the purge angle 19 during installation and is stored in controller 35 in certain embodiments to be used in calculating the optimum wheel 10 speeds needed as the airflows and purge pressures are further reduced. Previously, reliably obtaining the needed purge pressure information at the maximum flow condition has proven to be problematic since it depends on values taken by an air balancing contractor who typically is not familiar with the operation of the energy wheel 10.

Figure 11:
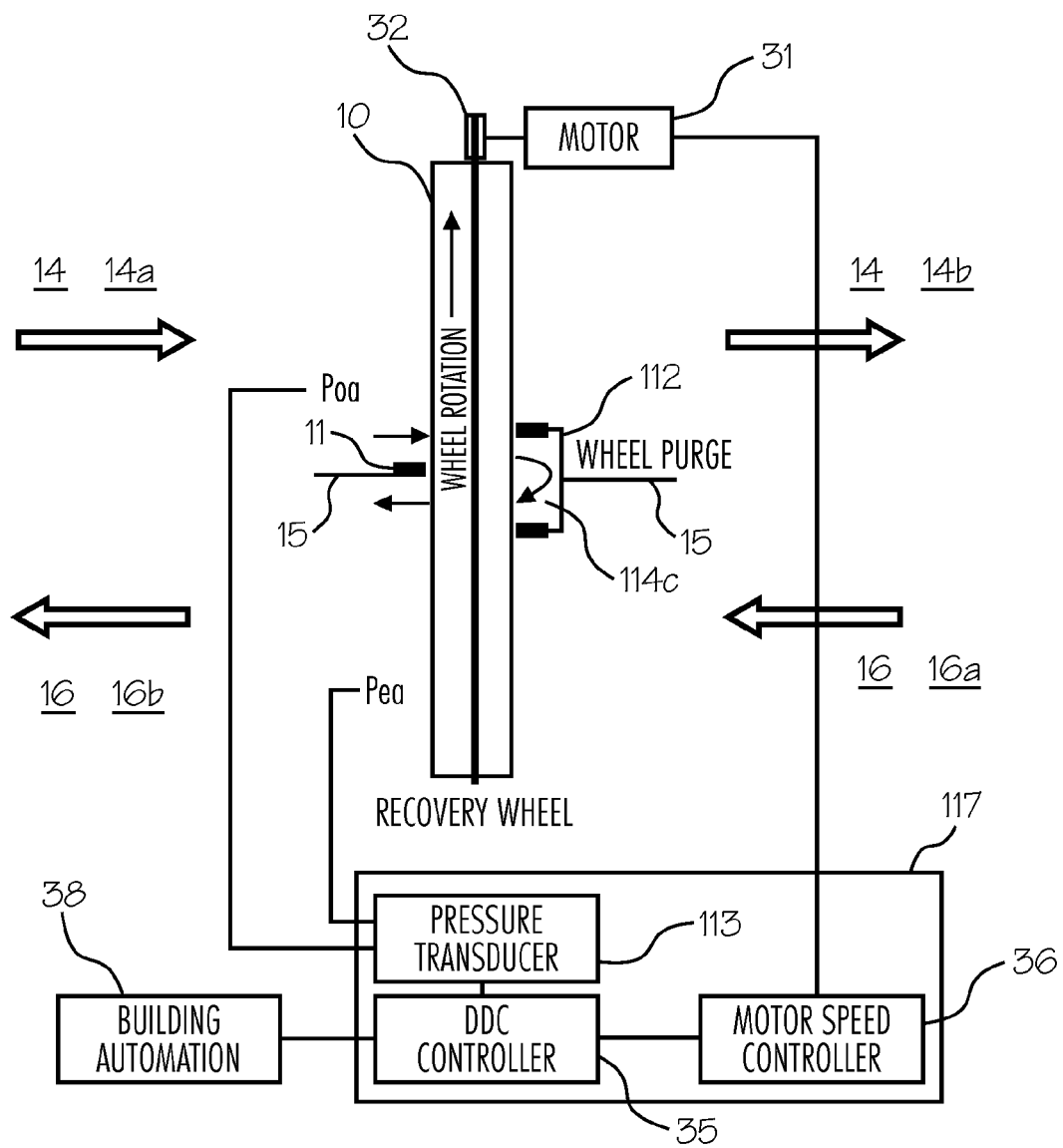
FIG. 11 is the block diagram of FIG. 3, but illustrating an embodiment having an alternate purge section configuration and measuring pressures or a differential pressure in different locations.
Figure 12:
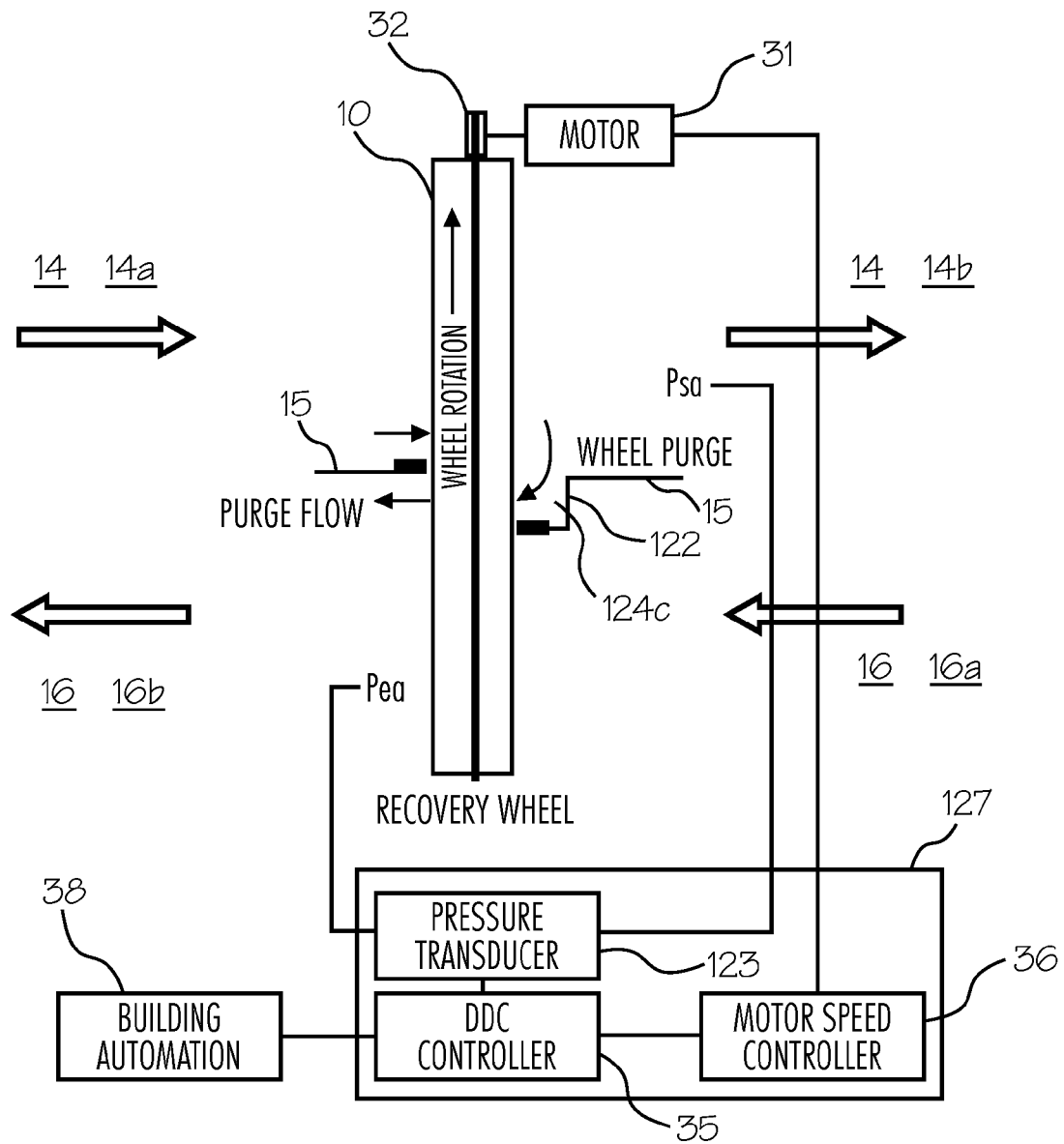
FIG. 12 is the block diagram of FIG. 3, but illustrating an embodiment having another alternate purge section configuration and measuring pressures or a differential pressure in even different locations.
Figure 13:
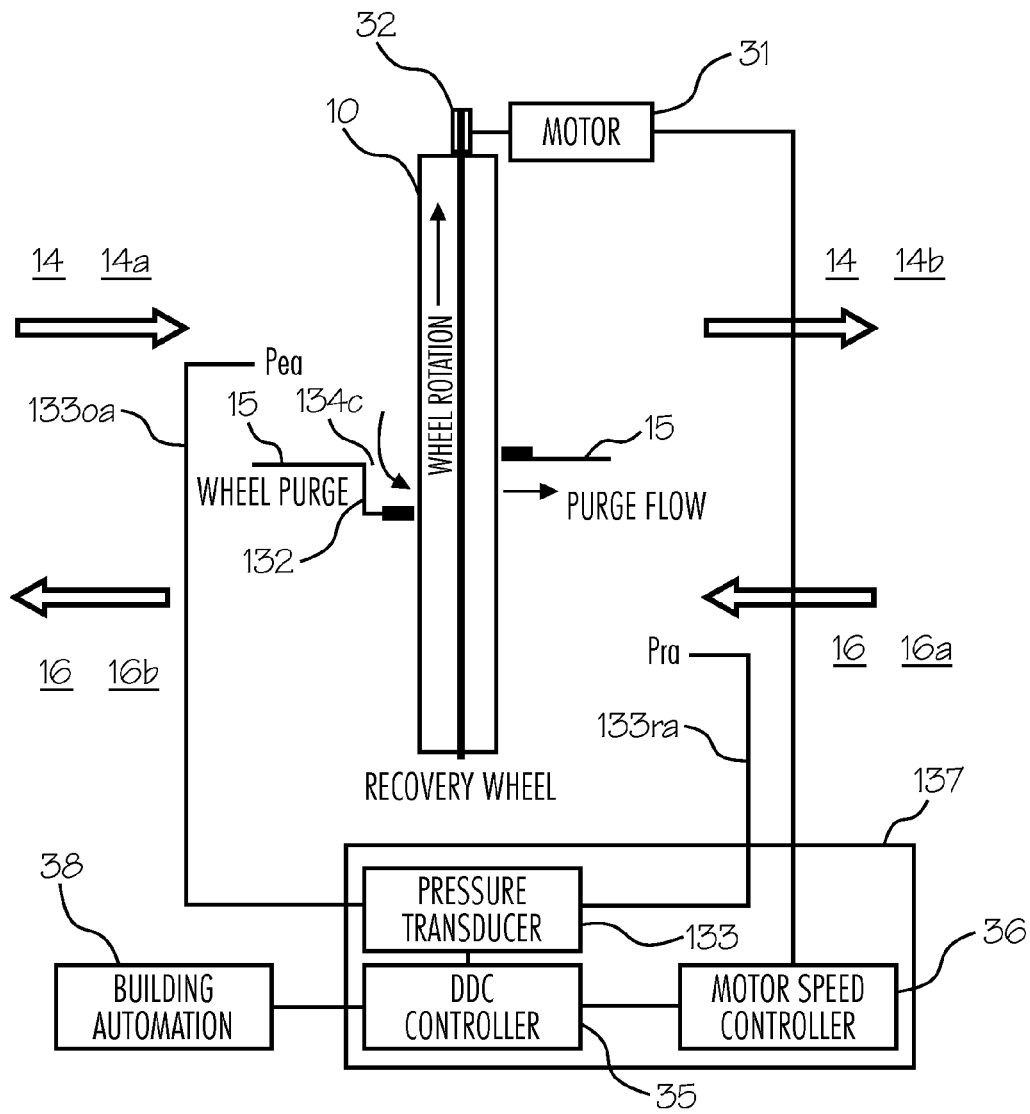
FIG. 13 is the block diagram of FIG. 3, but illustrating an embodiment having still another alternate purge section configuration and measuring one pressure or a differential pressure in a different direction.
Figure 14:
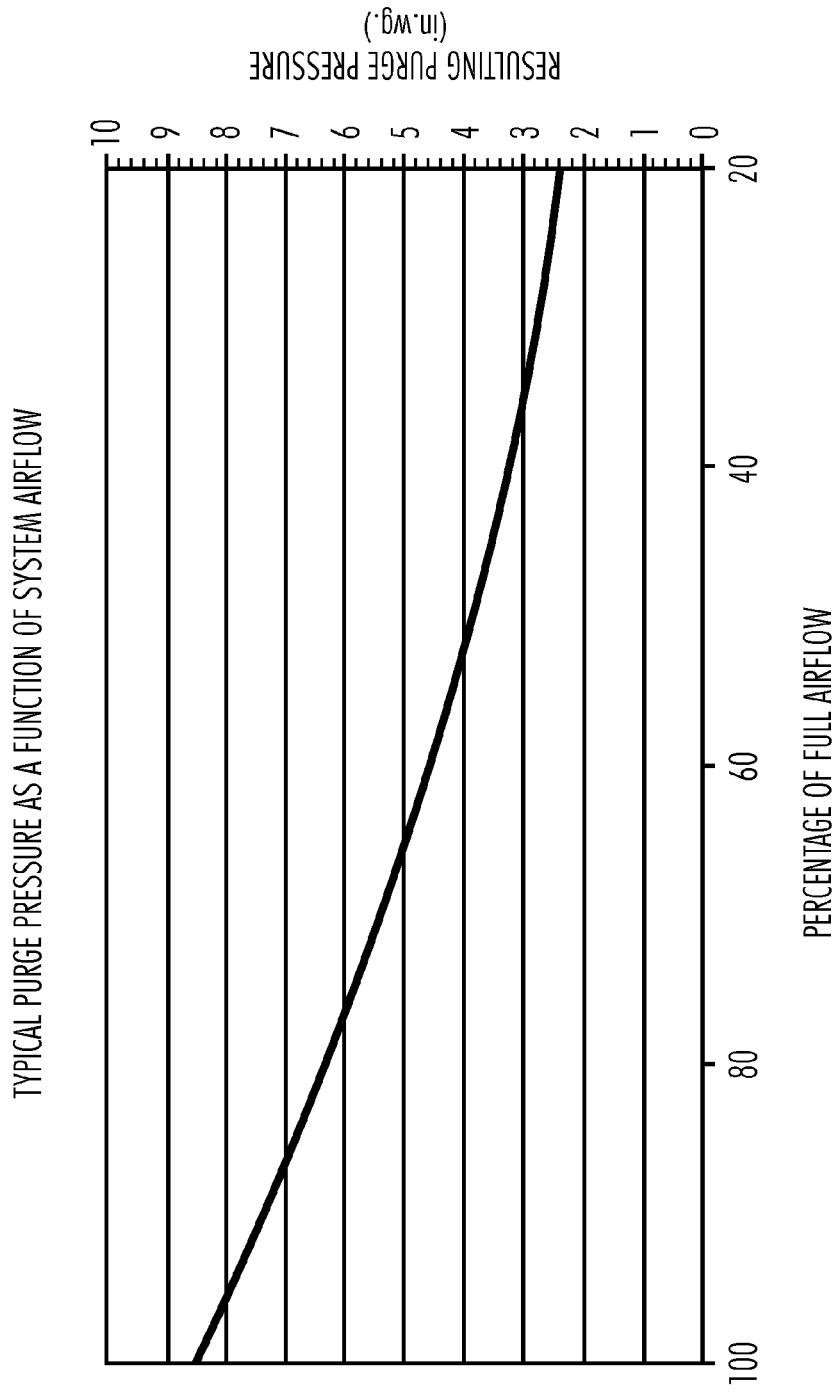
FIG. 14 is a graph showing typical purge pressures as a function of system airflow for an example of a recovery wheel in a ventilation system.
Figure 15:
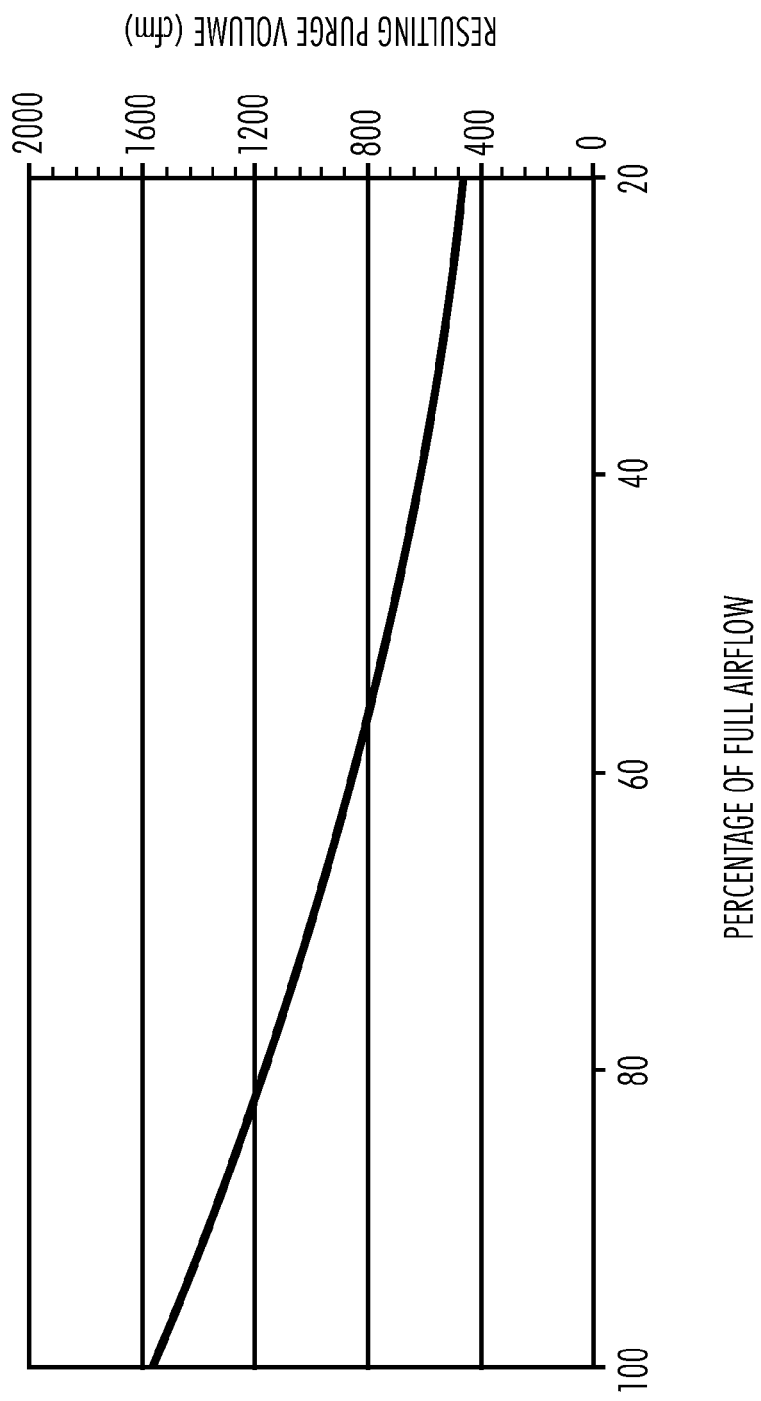
FIG. 15 is a graph showing typical purge airflow volumes (estimated) as a function of system airflow for an example of a recovery wheel in a ventilation system.
Figure 16:
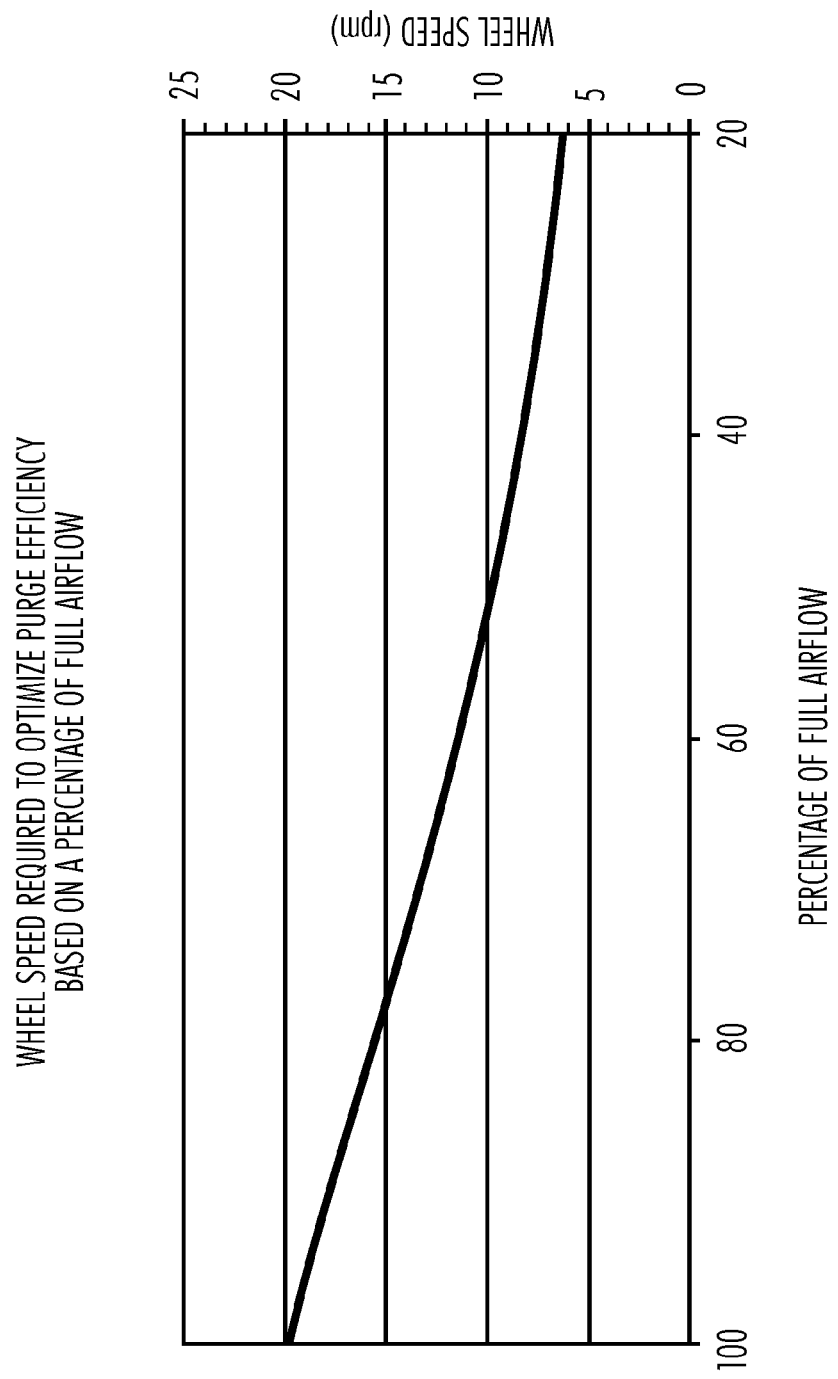
FIG. 16 is a graph showing typical recovery-wheel speed required to optimize purge efficiency as a function of system airflow for an example of a recovery wheel in a ventilation system.
Figure 17:
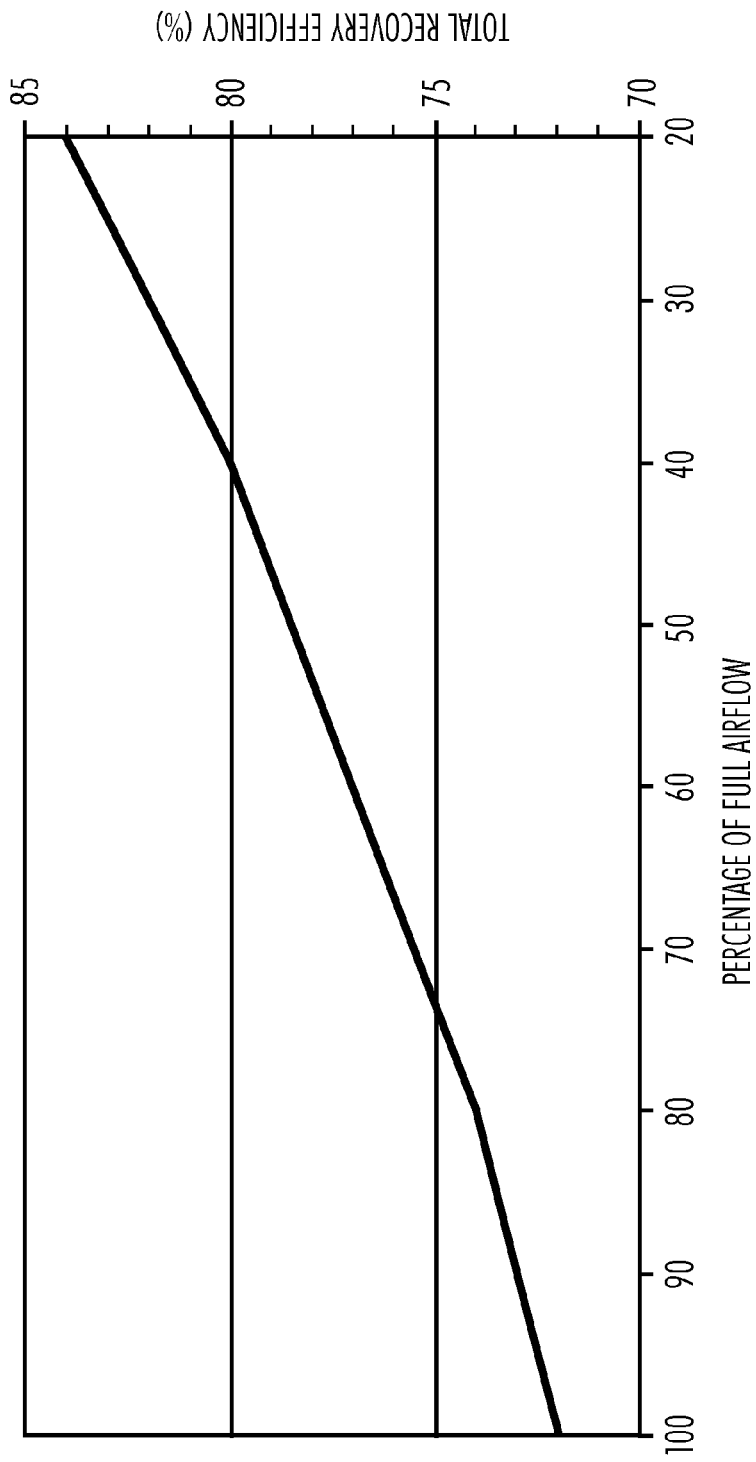
FIG. 17 is a graph showing typical recovery efficiency as a function of system airflow for an example of a system in which recovery-wheel speed changes to optimize purge flow as airflow changes in the ventilation system.

FIGS. 11 to 13 illustrate examples of alternate embodiments showing alternate configurations or locations for the purge section 12 and pressure measurement for purge efficiency optimization via pressure monitoring and active wheel speed modulation control, for example. Other embodiments may be apparent from this disclosure to a person of skill in the art. In FIG. 11, purge flow 114c passes through wheel 10 from left to right, and then is directed by purge section 112 back through wheel 10 from right to left, starting as outside air 14a and ending as exhaust air 16b. Pressure transducer 113 measures absolute or gauge pressures of, or a differential pressure between, outside air 14a and exhaust air 16b, which is the purge pressure in this embodiment. In other embodiments, purge flow 14c or 114c, for example, may be directed to exhaust air 16b without passing again through wheel 10, for example, by passing around the outside of wheel 10.

In the embodiment shown in FIG. 12 of purge section 122, purge flow 124c flows from right to left through recovery wheel 10. In this embodiment, purge flow 124c is taken from supply air 14b and joins exhaust air 16b after passing through wheel 10. In the embodiment illustrated, pressure transducer 123 measures absolute or gauge pressures of, or a differential pressure between, supply air 14b and exhaust air 16b, which is the purge pressure in this embodiment.

In the embodiment shown in FIG. 13 of purge section 132, purge flow 134c flows from left to right through recovery wheel 10. In this embodiment, purge flow 134c is taken from outside air 14a and joins return air 16a after passing through wheel 10. In the embodiment illustrated, pressure transducer 133 measures absolute or gauge pressures of, or a differential pressure between, outside air 14a and return air 16a, which is the purge pressure in this embodiment, similar to the embodiment shown in FIG. 3. A difference between the embodiment shown in FIG. 3 and the embodiment shown in FIG. 13 is that the purge flow 14c of FIG. 3 passes through wheel 10 (from left to right) above duct wall 15 while the purge flow 134c of FIG. 13 passes through wheel 10 (from left to right) below duct wall 15.

FIGS. 14-17 are graphs showing, for a particular embodiment, the relationship between purge pressure, and purge volume as flow is reduced, the wheel speed required at reduced flow to maintain purge efficiency, and how recovery efficiency is maintained despite a reduction in system airflow. These graphs illustrate various examples of performance and operational details of an example of an embodiment of the invention.

Various embodiments of the invention include a control system for a recovery wheel (e.g., 10) having a variable-speed drive system (e.g., including motor speed controller 36, motor 31, sensor 106, or a combination thereof) configured to turn the recovery wheel at a variable speed. In these embodiments, the control system may include at least one first input device configured to provide at least one first input signal corresponding to a pressure, a pressure differential, an airflow rate, a fan speed, or a combination thereof, for instance. These embodiments may also include a digital controller (e.g., 35) configured to receive the (at least one) first input signal and calculate a first speed-control signal for the variable-speed drive system (e.g., for motor speed controller 36). In many embodiments, this speed-control signal changes as a function of the first input signal.

FIGS. 3 and 9-13 illustrate several examples of such control systems, namely, control systems 37, 97, 107, 117, 127, and 137. Taking a closer look at control system 107, as an example, shown in FIG. 10, control system 107 includes digital controller 35, pressure transducers 91, 92, and 93, and motor speed controller 36. Motor speed controller 36 is an example of a variable-speed drive system, and may be considered a different component from control system 107 in some embodiments. In various embodiments, rotation sensor 106 may be part of control system 107, part of motor speed controller 36, or both.

Further, pressure transducers 91-93, in control system 107, are examples of first input devices. In some embodiments, one or more other sensors or transducers may be substituted for (or provided in addition to) pressure transducers 91-93. Some embodiments may have a fan speed sensor as a first input device, or may receive an input signal from a motor speed controller for a fan motor as a first input device, as further examples. Digital controller 35 may receive the first input signals and calculate the first speed-control signal, which may be communicated to motor speed controller 36. In some embodiments, the speed-control signal may correspond to the desired or instructed speed of wheel 10, and the speed of wheel 10 may change as a function of at least one first input signal. For example, in some embodiments, the speed of wheel 10 may decrease with decreasing system airflow rate, decreasing differential pressure, decreasing fan speed, etc., as described herein, for instance.

In some embodiments, control system 107 may include some or all of temperature and humidity sensors 101, 102, 103, and 104, or sensors that measure just temperature, just humidity, or enthalpy. In fact, some embodiments further include at least one second input device configured to provide at least one second input signal corresponding to a temperature, a humidity, or both. Temperature and humidity sensors 101, 102, 103, and 104, are examples of such second input devices.

Further, in some embodiments, the digital controller (e.g., 35) is configured to receive the second input signal(s) (e.g., from one or more of temperature and humidity sensors 101, 102, 103, and 104 in this example) and calculate a second speed-control signal for the variable-speed drive system (e.g., for motor speed controller 36). In such embodiments, the second speed-control signal may change as a function of at least one second input signal, for example. Further, in some embodiments, digital controller 35 is configured to select the lesser speed between the first speed-control signal and the second speed-control signal and provide that lesser speed to the variable-speed drive system (e.g., for motor speed controller 36). This selection may be performed within an algorithm or software within controller 35, for example. In other words, in various embodiments, controller 35 sets the speed of wheel 10 to be as high of a speed as is possible without exceeding a maximum speed for wheel 10 and without resulting in insufficient purge flow or excessive heat or moisture transfer across wheel 10.

Further, some embodiments of the invention include a recovery device controller (e.g., digital controller 35, motor speed controller 36, rotation sensor 106, motor 31, one of control systems 37, 97, 107, 117, 127, and 137, or a combination thereof), which may be configured to control the speed of the recovery wheel 10, for example, in response to changes in pressure, pressure differential, airflow rate, fan speed, or a combination thereof, as examples.

Figure 18:
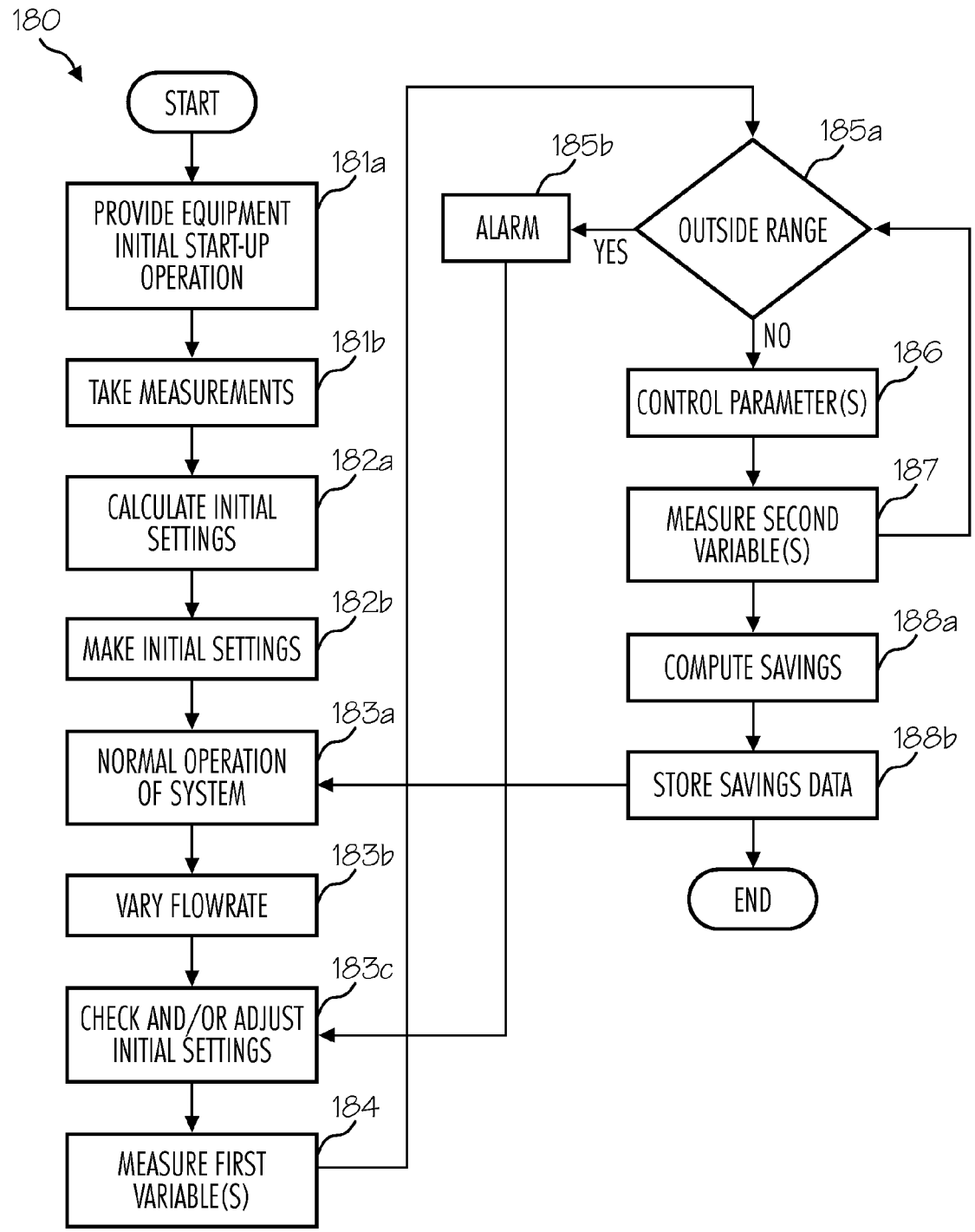
FIG. 18 is a flow chart illustrating steps and an example of an arrangement of various methods, including, among other things, methods of controlling a recovery wheel in a ventilation system, controlling a ventilation system to reduce energy consumption, and modifying a ventilation system to reduce energy consumption.

Turning now from a focus on systems to a focus on methods in accordance with the invention (although both sections describe both equipment and process to some extent), FIG. 18 is a flow chart illustrating various steps, different combinations or variations of which may be found in various sequences or orders in different embodiments of the invention. FIG. 18 illustrates, among other things, methods of controlling a recovery wheel in a ventilation system, methods of controlling a ventilation system to reduce energy consumption, methods of reducing energy consumption of a ventilation system, and methods of modifying a ventilation system to reduce energy consumption, as examples.

In the embodiment illustrated, method 180 includes a step of providing equipment (step 181a). In various embodiments, an owner, contractor, manufacturer, distributor, or supplier, for instance, may provide, obtain, or make equipment to construct, modify, or control a ventilation system, control system, or recovery device, for example, or a building with such equipment. The figures and description herein provide various examples of equipment that may be provided. In some embodiments, the ventilation system has (or already has) at least one fan and at least one recovery wheel, and the method includes the steps of obtaining or providing (step 181a) a variable-frequency drive for at least one fan of the ventilation system. Such a method 180 may be employed, for example, in conjunction with ventilation system 20 shown in FIG. 2. In this embodiment, the at-least one fan may be supply or outside air fan 22, exhaust fan 26, or both, and the recovery wheel may be recovery wheel 10 shown in FIG. 2 and described herein, for example.

Further, some embodiments may include a step of obtaining or providing (step 181a) a controller for a variable-frequency drive configured to vary the fan (e.g., 22, 26, or both) speed based on a need for ventilation. And some embodiments may include a step of obtaining, providing (step 181a), or configuring a controller (e.g., digital controller 35 shown in FIGS. 3 and 9-13) for a recovery wheel (e.g., 10) in the ventilation system to control the recovery wheel, which may be controlled in accordance with one or more of the methods described herein, for example.

Some of these embodiments further include a step of obtaining, providing (step 181a), installing, or having installed at least one sensor for measuring a pressure, a pressure differential, a flow rate through the recovery wheel, or a combination thereof. Examples of such a sensor include pressure transducers 33, 91, 92, 93, 113, 123, and 133 shown in FIGS. 3 and 9-13, for example. Other types of sensors or input devices may be used in other embodiments. In some embodiments, for example, a fan-speed sensor may be used, or fan speed may be obtained from a fan motor speed controller, for instance. Some embodiments may also include initial startup operation (shown in method 180 as part of step 181a), which may include starting and initial testing of equipment provided or obtained, in some embodiments, along with other equipment affected.

Some embodiments include, for example, a step of taking measurements (step 181b). In various embodiments, measurements may be taken (step 181b) before certain equipment is provided (step 181a) or vice versa, depending, for instance, on the measurements taken (step 181b) and equipment provided (step 181a). In some embodiments, measurements may be taken (step 181b) to determine which equipment is needed, while in other embodiments, measurements may be taken (step 181b) with which to determine or calculate adjustments or settings to be made to the equipment that has been recently provided or that previously existed. In various embodiments, one or more variables may be measured. Such variables may include, for example, one or more pressures such as absolute pressures or gauge pressures, pressure differentials, flow rates, fan speeds, contaminant concentration levels, temperatures, humidities, etc., as examples. In some embodiments, for instance, transducers, sensors, or input devices described herein may be used to take measurements (step 181b). In other embodiments, some or all measurements may be taken (step 181b) using special or hand-held instruments, for instance, that may not be part of the permanent ventilation system.

In some embodiments, a step of measuring at least one variable (e.g., 181b) includes, for example, measuring a first pressure and a second pressure (a first set of measurements) or measuring a pressure differential between the first pressure and the second pressure (a second set of measurements), as another example, (or both). Measurements taken by pressure transducers 33, 91-93, 113, 123, and 113, are examples, illustrated in FIGS. 3 and 9-13. Measurements may be taken (step 181b) over a period of time, for example, for different operating conditions of ventilation system 20, building 29, or both. As an example, measurements may be taken (step 181b)

at different operating conditions, for instance, to obtain the different pressures, flows, or both, shown in FIG. 2 for different percentages of a maximum flow condition from a minimum flow to a maximum flow. Measurements may be taken (step 181b) under actual building or ventilation system use, for instance, over days, weeks, months, or years, or actual conditions may be simulated, for instance, in hours, days, or perhaps weeks, for example.

Measurements taken (e.g., in step 181b) may be used to determine or calculate initial settings (step 182a). For instance, some embodiments may include a step of calculating (step 182a) an initial purge angle (e.g., angle 19 shown in FIG. 1b) for a recovery wheel (e.g., wheel 10) using at least one variable measured (e.g., in step 181b), for example, over a period of time. In various embodiments, initial settings (e.g., purge angle 19) may be made (step 182b) based on the calculations (e.g., calculated in step 182a). In embodiments where a purge angle (e.g., 19) is set (e.g., in step 182b), purge angle (e.g., 19) may be set for a maximum flow condition, a minimum flow condition, a maximum purge pressure condition, or a minimum purge pressure condition, as examples. In various embodiments wherein a recovery wheel 10 speed is changed as a function of air volume or purge pressure, as examples, setting (e.g., in step 182b) a fixed purge angle 19 for maximum flow or maximum pressure conditions may be appropriate, for example.

In some embodiments, equipment sizes, recovery wheel sizes, motor speed controller ranges or capabilities, selection of equipment, (e.g., to be provided in step 181a) may be made based on measurements taken (step 181b), calculations of initial settings (step 182a), or both, as examples. This may be the case, for instance, for existing systems that are to be modified or converted, for example, to reduce energy consumption. In certain embodiments, controller settings, maximum wheel speed, control valve settings, damper settings, and the like, may be made as part of the initial settings (step 182b) as examples.

In many embodiments, at least part of steps 181a to 182b may be performed manually. In fact, in some embodiments, all of these steps may be performed manually. But in some embodiments, at least some measurements may be taken (step 181b) automatically or in an automated process, for example, by controller 35. In some embodiments, at least some initial settings may be calculated (step 182a) automatically, by controller 35, or both. For example, in some embodiments, purge angle 19 may be calculated (step 182a) by controller 35 based on measurements taken (e.g., in step 181b) by controller 35, for instance, over a period of time. In some embodiments, a user may need to enter certain constants such as the size or other characteristics of the recovery wheel 10, for instance. Steps 183b to 188b, which will be described below, will generally be performed automatically or in an automated process, in many embodiments. In various embodiments, controller 35 or other electronic controller(s) or processor(s) may perform some or all of the control functions necessary to bring about steps 183b to 188b.

Various embodiments of the invention include a step of operating the ventilation or HVAC system (step 183a). This may include, for example, starting fans 22 and 26 and operating recovery wheel 10, as well as heating, cooling, or both, and, in some cases, other components of ventilation system 20 shown in FIG. 2 for example. In many embodiments, the system (e.g., ventilation system 20) may be operated (step 183a) initially without the presence of contaminants 18, with building 29 substantially unoccupied, or both, during which time the system may be tested, adjusted, balanced, or a combination thereof. In some embodiments, a variable air-volume ventilation system may be operated (step 183a) initially at maximum flow, at various percentages of maximum flow (e.g., as shown in FIG. 2), or a combination thereof. Accordingly, in the embodiment illustrated, method 180 includes a step of varying (at least one) flow rate (step 183b).

In various embodiments, the speed of outside air fan 22, exhaust fan 26 (shown in FIG. 2), or both, for example, may be varied to vary the flow rate (step 183b) of outside/supply airstream 14, return/exhaust airstream 16, or both, for example. In some embodiments, flow rates may be varied (step 183b) for or as part of testing, adjusting, or balancing. But even after testing, adjusting, and balancing, flow rates are varied (step 183b) in many embodiments, repeatedly, based on a need for ventilation at the time, for instance. For example, flow rates may be varied (step 183b) based on a number of hoods that are in operation, occupancy of the building, heating or cooling loads, humidity control requirements, production or concentration of contaminants 18, or the like, as examples.

In some embodiments, flow rates may be repeatedly or continuously varied (step 183b) throughout each day, for example, based on need, for instance, to reduce or minimize energy consumption, noise, volume of air to be filtered, wear and tear on equipment, etc. In a number of embodiments, the speed of outside air fan 22, exhaust fan 26, or both, for example, may be varied by a controller such as building automation 38, controller 35, one of control systems 37, 97, 107, 117, 127, and 137, or the like, for example, by sending a signal to at least one motor speed controller, which may be a variable-frequency drive or a variable-Voltage DC power supply, for example. In some embodiments, flows may be varied (step 183b) by turning one or more fans on or off, or by changing fan speeds to discrete speed settings, as further examples.

In addition, some such embodiments further include, for example, within the step of making initial settings (step 182b), setting a purge angle of the recovery wheel for a high-flow condition. Such embodiments may include (e.g., in step 183b) reducing the wheel speed for flow conditions having airflows lower than the high-flow condition. As described herein, reducing the wheel speed sufficiently will reduce the amount of purge flow that is required as purge pressure decreases with decreasing system flow conditions. Various embodiments also include a step of checking or adjusting (or both) initial settings (step 183c). In various such embodiments, settings may be checked and/or adjusted (step 183c) that were previously calculated (e.g., in step 182a) and set (e.g., in step 182b), for instance. In some such embodiments, for example, adequate purge flow may be verified.

Still referring to FIG. 18, some embodiments include a step of measuring at least one first variable (step 184). In various embodiments, the first variable (measured in step 184) may be a pressure, a pressure differential, a flow rate through the recovery wheel, or a combination thereof, for example. The first variable may be measured, for instance, with a sensor, transducer, or input device, as described herein, for example. Pressure transducers 33, 91-93, 113, 123, and 133 (shown in FIGS. 3 and 9-13) are some examples. In some embodiments, the purge pressure or pressure across one or both sides of wheel 10, or a combination thereof, or flow rates corresponding thereto, may constitute one or more first variables that may be measured (e.g., in step 184).

In certain embodiments, the step of measuring at least one first variable (step 184) may be initiated or controlled by controller 35 or one of control systems 37, 97, 107, 117, 127, and 137, as examples. A flow rate may be measured (e.g., in step 184), for example, with a rotating vane anemometer, by sensing a difference between static and velocity pressure at one or more airflow station locations, through a pressure measurement or differential pressure measurement across the recovery wheel, or with other flow-measurement instruments or devices. In other embodiments, a first variable (measured in step 184) may be the speed of a fan, such as fan 22, fan 26, or both, which may be measured (step 184) with a speed sensor, by detecting an AC frequency, by reading an output from a motor speed controller, by measuring a current or power consumption of the fan motor, etc. In some embodiments, no discrete step of measuring a variable (step 184) is made, but in at-least some such embodiments, a quantity of a variable (e.g., fan speed) may already be known, for instance, based on a command or signal given to vary or control a flow rate (step 183*b*).

Further, various embodiments include a step of controlling at least one parameter (step 186). In some embodiments, the step of controlling at least one parameter (step 186) may include controlling the parameter as a function of at least one variable or measurement (e.g., measured in step 184), for instance, using a sensor, transducer, or input device. In some embodiments, at least one parameter of recovery wheel 10, for example, may be controlled (step 186) as a function of a pressure, a pressure differential, a flow rate, or a fan speed, as examples, or a combination thereof, for instance, within a ventilation system such as system 20. In certain embodiments, the step of controlling at least one parameter (step 186), for example, of a recovery device, such as recovery wheel 10, includes changing the parameter to provide appropriate purge flow (e.g., 14*c*) through the recovery device (e.g., wheel 10) to maintain purge effectiveness and limit the carry-over of contaminants 18 from a return/exhaust airstream 16 to an outside/supply airstream 14 in a variable air-volume ventilation system for example. In addition, in some embodiments, the step of controlling at least one parameter (step 186), for example, of recovery wheel 10, includes controlling the rotational speed of recovery wheel 10. In individual embodiments, the step of controlling the at-least one parameter (step 186), for example, includes changing the rotational speed of recovery wheel 10 as a function of the measurement of the (at least one) first variable (step 184). In various embodiments, the parameter may be controlled (e.g., in step 186) so that it is proportional to a first variable (e.g., measured in step 184) or to a square, square root, or other power of a first variable, for example, over at least part of a range, or at least under certain conditions, for instance.

In other embodiments, other parameters may be controlled (step 186) in lieu of (or in addition to) wheel 10 speed. For example, in some embodiments, purge angle 19 may be controlled, for instance, using an actuator or servo. In other embodiments, a control valve or damper within a purge structure, purge system, or purge duct may be controlled, or one or more dampers within main system ducts may be controlled, for instance, to control purge pressure. In some embodiments, one or more fans may be controlled, for example, fans within or that handle outside/supply airstream 14, return/exhaust airstream 16, or both, may be controlled, to adjust purge pressure, for instance. For example, in some embodiments, the speed of a fan blowing outside air 14*a* may be controlled relative to a fan blowing supply air 14*b*. In some embodiments, the speed of a fan blowing return air 16*a* may be controlled relative to a fan blowing exhaust air 16*b*, or a combination thereof. In other embodiments, a purge fan, for example, dedicated to providing or increasing purge flow (e.g., similar to 14*c*) may be provided, and in some such embodiments, may be actively controlled (e.g., in step 186) as pressure or flow rate vary, for example. These are all examples of parameters of the ventilation system 20 that may be controlled (e.g., in step 186) in various embodiments. But in some embodiments having a purge fan, the purge fan may provide a constant purge flow 14*c* for a constant wheel 10 speed, for example, while in other embodiments, the speed of a purge fan may vary (e.g., be controlled in step 186) to provide a varying purge flow 14*c*, for example, changing as wheel 10 speed changes, as purge pressure changes, or both. Some embodiments do not control a parameter (e.g., lack step 186), for instance, embodiments having a purge fan wherein the purge fan provides a constant purge flow 14*c* for a constant wheel 10 speed. These are all examples of alternate embodiments that may provide appropriate purge flow through recovery wheel 10 as the airflow rate varies in order to maintain purge effectiveness and limit carry-over of contaminants (e.g., 18) from the return/exhaust airstream 16 to the outside/supply airstream 14 at lower airflow rates while avoiding excessive purge flow 14*c* at higher airflow rates.

However, as used herein, control of fans or dampers that handle substantially all of outside/supply airstream 14 or return/exhaust airstream 16 (e.g., control of fan 22, 26, or both) is not considered to be control of a parameter of the wheel 10. But as used herein, control of dampers or fans within the purge flow 14*c* or within the purge structure 12 are examples of embodiments of control of a parameter of wheel 10, as are control of purge section 12, purge angle 19, or wheel speed, for instance. In embodiments where fan speed is controlled, fan speed may be continuously varied, varied in discrete speed steps, or fans (e.g., some of a plurality of fans) may be turned on or off as needed. In some embodiments, a plurality of parameters may be controlled (step 186) in order to achieve the desired result, which may include one or more parameters described herein.

Various methods of controlling a recovery wheel in a ventilation system may be part of a method of controlling a ventilation system to reduce energy consumption, as an example, which may include the steps of varying at least one airflow rate (step 183*b*) within the ventilation system based on a need for ventilation at the time, and controlling (step 186) a recovery wheel in the ventilation system, for example, in accordance with one or more of the embodiments described herein. In some embodiments, for instance, the speed of the recovery wheel is controlled (step 186), such that the recovery wheel turns faster when the airflow rate is higher. In such embodiments, airflow rate(s) may be reduced (e.g., in step 183*b*), for example, of outside/supply airstream 14, return/exhaust airstream 16, or both ) when less flow is needed to reduce energy consumption by reducing fan power required, heating or cooling requirements, etc.

In some specific embodiments, the rotational speed of the recovery wheel is controlled (step 186) to be substantially proportional to the airflow rate, as an example. In various embodiments, the rotational speed of the recovery wheel 10 is controlled (step 186) to be substantially proportional to the purge air 14*c* flow rate, for instance, to the flow rate of outside/supply airstream 14, to the flow rate of return/exhaust airstream 16, to the flow rate of outside air 14*a*, to the flow rate of supply air 14*b*, to the flow rate of return air 16*a*, or to the flow rate of exhaust air 16*b*, or a combination thereof, as examples. In different embodiments, the rotational speed of the recovery wheel may be controlled (step 186) to be substantially proportional to an airflow rate over part or all of the range of flows, for example. As used herein, substantially proportional means proportional to within 10 percent over a variation in flow rate of at least a factor of two (e.g., 50% flow to 100% flow). Such an airflow rate may be measured directly, or may be calculated, for example, by digital controller 35, from a differential pressure, one or more absolute or gauge pressures, or one or more fan speeds, for instance.

Some particular embodiments include a step of setting a purge angle 19 of the recovery wheel (e.g., in step 182b) for a high-flow condition, and reducing the wheel speed (step 186) for flow conditions having airflows that are lower than the high-flow condition. Such a step of setting a purge angle 19 of the recovery wheel (step 182b) may involve loosening one or more bolts or screws, measuring purge angle 19, moving purge structure 12 into the appropriate location, and retightening the bolts or screws, for example. The ventilation system 20 (e.g., fans 22 and 26 and recovery wheel 10) may be shut off for this step. The ventilation system 20 may then be turned back on and tested (e.g., in step 183c), for example, for purge flow, lack of contaminant 18 carry-over, or the like, for instance, over a range of flow rates.

Further, some embodiments further include a step of evaluating whether a variable, measurement, or input, for example, is outside of a range (step 185a) or above or below a threshold. For example, in some embodiments, the range or threshold is a range or threshold of acceptable purge pressures (e.g., measured by transducer 33 shown in FIG. 3) at which adequate purge flow can be attained. Some embodiments further include a step of providing an alarm (step 185b) or alarming if at least one variable (e.g., measured in step 184) is outside of at least one acceptable range (e.g., as determined in step 186) or above or below a threshold. For instance, an alarm may be provided to building maintenance or operating personnel, or to laboratory or hood users, if adequate purge pressure or flow is not available to assure that such personnel are notified if contaminants 18 may pass from return/exhaust airstream 16 to outside/supply stream 14. In some embodiments, an alarm may be initiated or provided (step 185b) by building automation 38, by controller 35, or one of control systems 37, 97, 107, 117, 127, and 137, as examples. An alarm may be in the form of a sound (audible alarm), voice, screen display, indicator light, e-mail, text message, voice mail, automated telephone call, page, or the like, or a combination thereof, in different embodiments.

Still further, some embodiments further include at least one step of measuring at least one second variable (step 187). A second variable (e.g., measured in step 187) may be, for example, a temperature, a humidity, or both, for instance, as measured by sensors 101 to 104 shown in FIG. 10. In some embodiments, the measurement of the second variable (step 187) may be used to control the parameter (step 186). For example, In some embodiments, temperatures, humidities, or enthalpies (e.g., measured in step 187 by at least one of sensors 101-104) are used for controlling (step 186) the rotational speed of recovery wheel 10 as a function of the temperature, the humidity, or an enthalpy calculated using the temperature and the humidity.

Some such embodiments further include measuring second variable(s) (step 187) and computing benefit or savings (step 188a) resulting, for example, from a recovery device. For instance, in some embodiments, recovery efficiency, energy savings resulting from use of recovery wheel 10, or both, may be computed (step 188a), for example, using controller 35, building automation 38, or one of control systems 37, 97, 107, 117, 127, and 137, as examples, and using temperatures, humidities, or enthalpies (e.g., measured in step 187 by at least some of sensors 101-104).

In some embodiments, savings data (e.g., computed in step 188a) may be stored (step 188b). In certain embodiments, storage data may be stored (step 188b) in memory or in a storage media, for instance, over time. Savings data may be used to calculate benefit or savings over time, for example, of a recovery device or recovery wheel. As examples, some embodiments of the invention include, saving real time recovery efficiency data, real time energy savings data, average recovery efficiency data, total energy savings data, or a combination thereof, over a period of time. In some embodiments, such data may be used to calculate average or overall recovery efficiency, energy saved, dollars saved, etc. Data, results, or both, may be compared to previous data or results, included in one or more reports, printed, displayed on a screen or other display, sent by phone, e-mail, or text message, displayed on a website which may be secured, or the like, as examples.

Certain embodiments include methods of reducing energy consumption of a ventilation system (e.g., ventilation system 20). Such methods may utilize a rotating recovery wheel 10 to transfer heat, moisture, or both, between a return/exhaust airstream 16 and an outside/supply airstream 14 (e.g., in step 183a shown in FIG. 18 or as described herein). Some such embodiments also utilize or control (or both) at least one variable-speed drive system to vary a speed of at least one fan (e.g., 22, 26, or both) within the ventilation system (e.g., 20) to vary at least one airflow rate (e.g., step 183b) within the ventilation system based on a need for ventilation at the time. These embodiments may also include providing appropriate purge flow (e.g., 14c) through the recovery wheel 10 (e.g., in step 183a) as the airflow rate (e.g., of 14, 16, or both) varies to maintain purge effectiveness and limit carry-over of contaminants (e.g., 18) from the return/exhaust airstream 16 to the outside/supply airstream 14 at lower airflow rates while avoiding excessive purge flow at higher airflow rates. As used herein, unless otherwise defined, such airflow rates may be airflow rates of return/exhaust airstream 16, outside/supply airstream 14, or both. Further, unless stated otherwise, as used herein, "lower" airflow rates means less than 75% of maximum flow, while "higher" airflow rates means greater than 85% of maximum airflow. In particular embodiments, "lower" airflow rates are less than 50% of maximum flow, "higher" airflow rates are greater than 90% of maximum airflow, or both. Further, unless stated otherwise, as used herein, "excessive purge flow" means more than twice the purge flow (e.g., 14c) needed to obtain the desired purge effectiveness (e.g., to meet an applicable contaminant 18 carryover standard). Further still, unless stated otherwise, as used herein, "appropriate purge flow" means adequate purge flow (e.g., 14c) to obtain the desired purge effectiveness (e.g., to meet an applicable contaminant 18 carryover standard). Some embodiments of these methods may also include other steps shown in FIG. 18 or described herein, for example.

In many embodiments, steps such as normal operation of the system (step 183a) through control of parameters (step 186) or even through storage of data (step 188b) may be repeated, for example, as the flow rate is varied (step 183b) in response to varying need for ventilation. For example, in some embodiments, variables may be measured (e.g., step 184, step 187, or both) continuously or at regular intervals of time, for instance, and parameters may be controlled (step 186), or other steps taken, for example, if variables have changed or have changed by more than a threshold value. In many embodiments, some or all repeated steps may be automatic, and may be performed using controller 35, building automation 38, or one of control systems 37, 97, 107, 117, 127, and 137, as examples.

Some elements, parameters, measurements, functions, components, and the like may be described herein as being required, but may only be required in certain embodiments. Further, benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims or the invention. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method of controlling a recovery wheel in a variable air-volume ventilation system to reduce energy consumption and simultaneously limit the carry-over of exhaust air contaminants into a supply airstream, the method comprising at least the steps of:

setting an initial fixed purge angle of the recovery wheel for a high-flow condition of the variable air-volume ventilation system; automatically varying at least one airflow rate within the ventilation system based on a need for ventilation wherein the at least one airflow rate passes through the recovery wheel; and using an automated process, modulating rotational speed of the recovery wheel as a function of at least one of a pressure, a pressure differential, a flow rate, or a fan speed, within the ventilation system; wherein the step of modulating rotational speed of the recovery wheel includes repeatedly changing the rotational speed, and reducing the wheel speed for flow conditions having airflow rates lower than the high-flow condition; and wherein the step of modulating rotational speed of the recovery wheel further includes providing adequate purge flow to limit the carry-over of exhaust air contaminants into the supply airstream to meet an applicable contaminant carryover standard, while avoiding having more than twice the purge flow needed to meet the applicable contaminant carryover standard.

2. The method of claim 1 further comprising steps of: using an automated process, measuring at least one of a temperature or a humidity; and changing and controlling rotational speed of the recovery wheel as a function of at least one of: the temperature, the humidity, or an enthalpy calculated using the temperature and the humidity.

3. The method of claim 1 further comprising steps of:
measuring at least one of a temperature or a humidity;
computing at least one of recovery efficiency or energy savings resulting from use of the recovery wheel; and
saving over a period of time at least one of: real time recovery efficiency data, real time energy savings data, average recovery efficiency data, or total energy savings data.

4. The method of claim 1 wherein the step of modulating the rotational speed of the recovery wheel includes making the recovery wheel turns faster when the airflow rate is higher.

5. The method of claim 1 wherein the step of modulating the rotational speed of the recovery wheel includes making the rotational speed of the recovery wheel substantially proportional to the airflow rate as the airflow rate varies.

6. The method of claim 1 wherein the step of setting the initial fixed purge angle of the recovery wheel for the high-flow condition comprises moving a purge structure into an appropriate location and tightening bolts or screws.

7. The method of claim 1 further comprising a step of alarming if at least one of pressure, pressure differential, or flow rate are such that sufficient purge flow or proper seal operation may not exist.

8. A The method of claim 1, the ventilation system having at least one fan and at least one recovery wheel, the method further comprising in any order at least the steps of:
obtaining or providing a variable speed drive driving at-least one fan of the ventilation system;
obtaining or providing a controller that controls the variable speed drive and that varies a speed of the fan based on a need for ventilation; and
obtaining, providing, or configuring a controller that modulates rotational speed of the recovery wheel in the ventilation system.

9. The method of claim 1 further comprising a step of:
installing or having installed at least one sensor that measures at least one of a pressure, a pressure differential, or a flow rate through the recovery wheel; and
wherein the step of modulating rotational speed of the recovery wheel includes changing and controlling the rotational speed of the recovery wheel as a function of at least one measurement of the at-least one sensor to maintain appropriate purge flow through the recovery wheel as the at least one airflow rate varies.

10. The method of claim 1 further comprising a step of:
measuring at least one variable wherein the variable is at least one of a pressure, a pressure differential, or a flow rate through the recovery wheel; and
wherein the step of modulating rotational speed of the recovery wheel includes changing rotational speed of the recovery wheel as a function of the measurement of the at-least one variable, maintaining purge effectiveness, and limiting carryover of contaminants from an exhaust airstream to supply airstream in the variable air volume ventilation system.

11. The method of claim 10 further comprising a step of alarming if the at-least one variable is outside of at least one acceptable range.

12. The method of claim 10 wherein the step of measuring at least one variable includes measuring over a period of time at least one of a first set of measurements or a second set of measurements, wherein the first set of measurements includes a first pressure and a second pressure, and the second set of measurements includes a pressure differential between the first pressure and the second pressure, and wherein the method further includes a step of automatically calculating an initial purge angle for the recovery wheel using the at-least one variable measured over the period of time.

13. A control system for a recovery wheel having a variable-speed drive system turning the recovery wheel at a variable speed, the control system comprising: at least one first input device providing at least one first input signal corresponding to at least one of a pressure, a pressure differential, an airflow rate or a fan speed; a digital controller receiving the at-least one first input signal, using the first input signal to calculate a first speed-control signal, and providing the first speed-control signal to the variable-speed drive system; wherein the controller repeatedly calculates and changes the first speed-control signal which changes a rotational speed of the recovery wheel as a function of changes in the at-least one first input signal, while maintaining purge effectiveness and limiting carryover of contaminants from an exhaust airstream to a supply airstream as the at least one first input signal changes.

14. The control system of claim 13 further comprising
at least one second input device providing at least one second input signal corresponding to at least one of a temperature or a humidity;
wherein the digital controller receives the at-least one second input signal and calculates a second speed-control signal for the variable-speed drive system, wherein the second speed-control signal changes as a function of the at-least one second input signal; and
wherein the digital controller selects the lesser speed between the first speed-control signal and the second speed-control signal and provides the lesser speed to the variable-speed drive system.

15. A ventilation system for ventilating an at-least partially enclosed space, the ventilation system comprising:
a supply system drawing air from outside the space and forming a supply airstream that is delivered to the space;
an exhaust system that draws air from within the space and forms an exhaust airstream that is exhausted outside of the space, wherein at least one of the supply system or the exhaust system is a variable air-volume system;
a recovery device that transfers at least one of heat or moisture between the exhaust airstream and the supply airstream;
a purge system that purges contaminants from the recovery device by passing a purge stream through at least part of the recovery device; and
a controller modulating at least one parameter as a function of changes in at least one airflow volume to provide appropriate purge flow through the recovery device maintaining purge effectiveness and limiting carry-over of contaminants from the exhaust airstream to the supply airstream as the at least one airflow volume changes.

16. The ventilation system of claim 15 wherein:
the supply system includes an outside air fan having a variable-speed drive system;
the exhaust system includes an exhaust fan having a variable-speed drive system;
the recovery device includes a recovery wheel having a variable-speed drive system; and
said controller controls and changes the speed of the recovery wheel in response to changes in at least one of pressure, pressure differential, airflow rate, or fan speed.

17. The ventilation system of claim 15 wherein the recovery device includes a recovery wheel having a variable-speed drive system and said controller controls the speed of the recovery wheel in response to changes in at least one of pressure, pressure differential, or airflow rate, the ventilation system further comprising:
at least one first input device that provides at least one first input signal corresponding to at least one of a pressure, a pressure differential, or an airflow rate;
wherein the controller comprises a digital controller that receives the at-least one first input signal and automatically calculates a first speed-control signal for the variable-speed drive system, wherein the first speed-control signal changes as a function of the at-least one first input signal.

18. The ventilation system of claim 17 further comprising at least one second input device that provides at least one second input signal corresponding to at least one of a temperature or a humidity;
wherein the digital controller receives the at-least one second input signal and automatically calculates a second speed-control signal for the variable-speed drive system, wherein the second speed-control signal changes as a function of the at-least one second input signal; and
wherein the digital controller automatically selects the lesser speed between the first speed-control signal and the second speed-control signal and provides the lesser speed to the variable-speed drive system.

19. A building comprising the ventilation system of claim 15, the building further comprising the at-least partially enclosed space.

20. A method of reducing energy consumption of a ventilation system, the method comprising in any order at least the steps of: utilizing a rotating recovery wheel to transfer at least one of heat or moisture between an exhaust airstream and a supply airstream; utilizing and controlling at least one variable-speed drive system to vary a speed of at least one fan within the ventilation system to vary at least one airflow rate within the ventilation system through the recovery wheel based on a need for ventilation at the time; and automatically modulating at least one parameter of the ventilation system to provide appropriate purge flow through the recovery wheel by automatically changing rotational speed of the recovery wheel as the least one airflow rate varies maintaining purge effectiveness and limiting carry-over of contaminants from the exhaust airstream to the supply airstream at lower airflow rates while avoiding excessive purge flow at higher airflow rates.

21. A ventilation system for ventilating an at-least partially enclosed space, the ventilation system comprising: a rotating recovery wheel transferring at least one of heat or moisture between an exhaust airstream and a supply airstream; at least one variable-speed drive system that automatically varies a speed of at least one fan within the ventilation system to vary at least one airflow rate within the ventilation system through the recovery wheel based on a need for ventilation; and a controller automatically providing appropriate purge flow through the recovery wheel as the airflow rate varies maintaining purge effectiveness and limiting carry-over of contaminants from the exhaust airstream to the supply airstream at both higher and lower airflow rates while avoiding excessive purge flow at higher airflow rates; wherein the controller automatically modulates speed of the recovery wheel as a function of at least one of a pressure, a pressure differential, a flow rate, or a fan speed, within the ventilation system.

22. The ventilation system of claim 21 wherein the controller providing appropriate purge flow through the recovery wheel comprises a variable-speed drive system that drives the recovery wheel.

23. The ventilation system of claim 22 wherein the controller operates the recovery wheel at a higher speed when an airflow rate within the ventilation system is higher, and the controller operates the recovery wheel at a lower speed when an airflow rate within the ventilation system is lower maintaining purge effectiveness and limiting carry-over of contaminants from the exhaust airstream to the supply airstream at lower airflow rates while avoiding excessive purge flow at higher airflow rates.

* * * * *

UNITED STATES PATENT AND TRADEMARK OFFICE
CERTIFICATE OF CORRECTION

| | | |
|---|---|---|
| PATENT NO. | : 7,886,986 B2 | Page 1 of 1 |
| APPLICATION NO. | : 11/594586 | |
| DATED | : February 15, 2011 | |
| INVENTOR(S) | : John C. Fischer, Jr. et al. | |

It is certified that error appears in the above-identified patent and that said Letters Patent is hereby corrected as shown below:

At column 14, line 6, delete "Would" and insert --would--.

At column 15, line 17, after "through the purge", delete the ",".

At column 15, line 43, between "14," and "16", insert a space.

At column 15, line 51, "10'" should not be bolded.

At column 16, line 13, "10'" should not be bolded.

At column 17, line 32, "20" should not be bolded.

At column 19, line 51, delete "14a" and insert --14b--.

At column 28, line 24, delete "1 4c" and insert --14c--.

At column 31, line 59, delete "turns" and insert --turn--.

At column 32, line 5, delete "A".

At column 32, lines 10-11, delete "variable speed" and insert --variable-speed -- (to include the hyphen).

At column 32, line 64, after "input signal" delete the ",".

At column 34, line 26, after "as the" and before "least" insert --at--.

Signed and Sealed this
Tenth Day of May, 2011

David J. Kappos
*Director of the United States Patent and Trademark Office*